(12) United States Patent
Chang

(10) Patent No.: US 12,435,841 B2
(45) Date of Patent: Oct. 7, 2025

(54) DEVICES OF DETERMINING PIPES

(71) Applicant: United Benefit Corp., New Taipei (TW)

(72) Inventor: Yuan Hse Chang, New Taipei (TW)

(73) Assignee: United Benefit Corp., New Taipei (TW)

( * ) Notice: Subject to any disclaimer, the term of this patent is extended or adjusted under 35 U.S.C. 154(b) by 516 days.

(21) Appl. No.: 18/055,008

(22) Filed: Nov. 14, 2022

(65) Prior Publication Data

US 2023/0220958 A1  Jul. 13, 2023

(30) Foreign Application Priority Data

Jan. 7, 2022  (TW) .................................. 111100770

(51) Int. Cl.
| | | |
|---|---|---|
| *F17D 5/00* | (2006.01) | |
| *G01N 3/42* | (2006.01) | |
| *G01N 27/04* | (2006.01) | |
| *G01N 29/07* | (2006.01) | |

(52) U.S. Cl.
CPC ................. *F17D 5/00* (2013.01); *G01N 3/42* (2013.01); *G01N 27/041* (2013.01); *G01N 29/07* (2013.01); *G01N 2291/02854* (2013.01)

(58) Field of Classification Search
CPC .......... F17D 5/00; G01N 3/42; G01N 27/041; G01N 29/07; G01N 2291/02854
See application file for complete search history.

(56) References Cited

U.S. PATENT DOCUMENTS

2004/0006437 A1* 1/2004 Lam ..................... G01N 29/225
702/54
2017/0268915 A1* 9/2017 Gestner ................. G01N 29/44

FOREIGN PATENT DOCUMENTS

| CN | 111521626 A | 8/2020 |
| CN | 113052220 A | 6/2021 |

OTHER PUBLICATIONS

Search Report of corresponding TW application 111100770, published on Oct. 17, 2022.

* cited by examiner

*Primary Examiner* — Yoshihisa Ishizuka
(74) *Attorney, Agent, or Firm* — Wang Law Firm, Inc.

(57) ABSTRACT

A device of determining pipes includes a memory unit, a processing unit and a communication interface, wherein the processing unit is connected to the memory unit and the communication interface. The memory unit has stored pipe names, reference pipe outside diameter values and orders of the pipe names corresponding to the reference pipe outside diameter values. The processing unit receives an outside diameter measuring data of a pipe, compares the outside diameter measuring data with the reference pipe outside diameter values, selects the pipe name corresponding to the reference pipe outside diameter value same as the outside diameter measuring data, and generates at least one the pipe name that matches the outside diameter measuring data according to the selected order of the pipe name. The communication interface outputs the pipe name that matches the outside diameter measuring data.

9 Claims, 16 Drawing Sheets

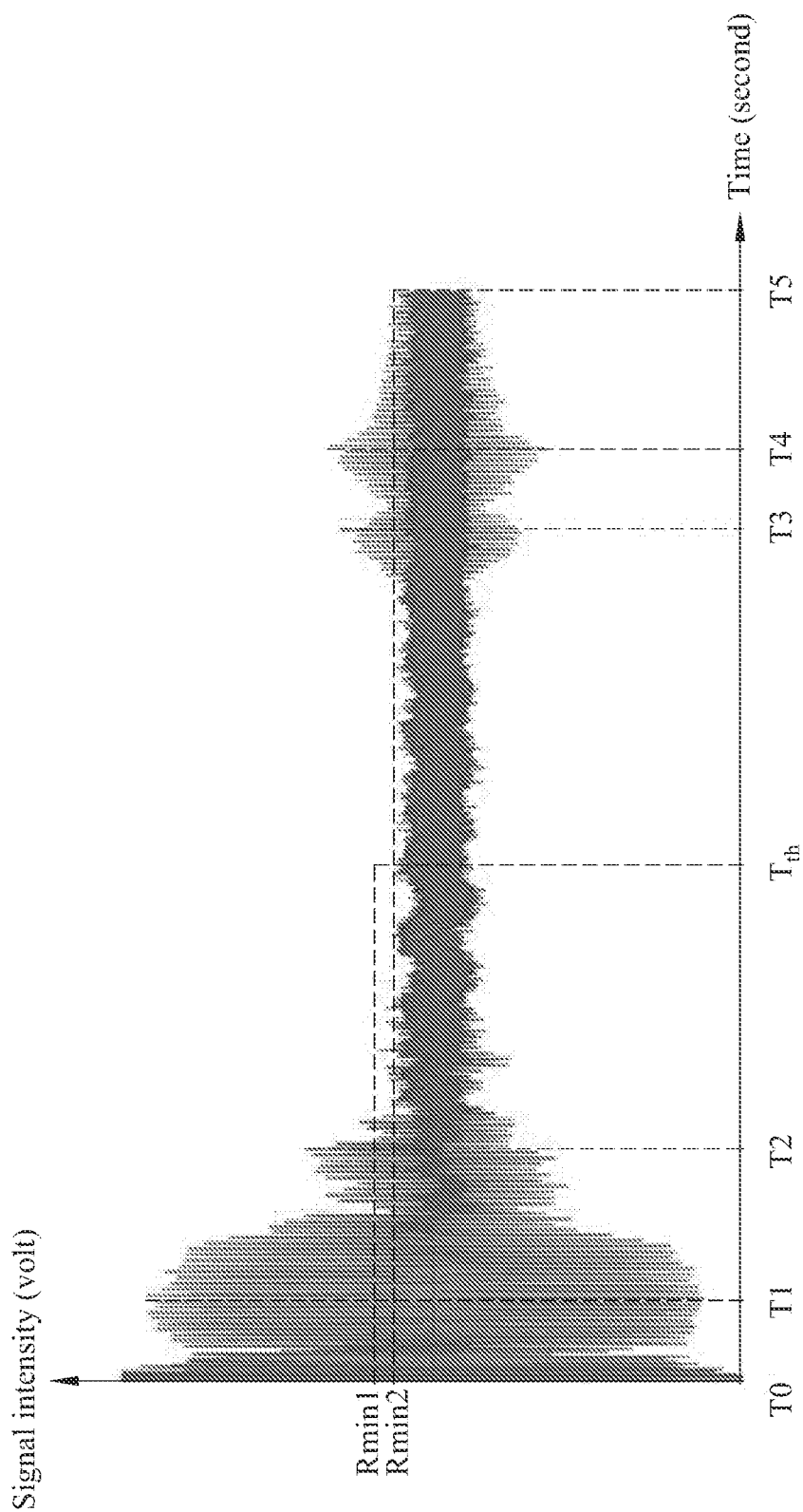

DEVICES OF DETERMINING PIPES

CROSS-REFERENCE TO RELATED APPLICATION

This application claims the priority of Taiwanese patent application No. 111100770, filed on Jan. 7, 2022, which is incorporated herewith by reference.

BACKGROUND OF THE INVENTION

1. Field of the Invention

The present application relates to a device of determining pipes.

2. The Prior Arts

People's livelihood and industries need to use pipe systems for transporting fluid, and different fluids are usually transported by different pipes. For convenience of manufacturing, assembling and replacing the pipes, respective countries formulate pipe standards (for example: American standard ASTM, Japan standard JIS, Germany standard DIN, Taiwan standard CNS) corresponding to various pipes, which includes materials, nominal pipe diameters, mean outside diameters, outside diameter tolerances, thickness tolerances, approximate inside diameter, upper limit of working pressure, etc. The pipe system is an important infrastructure, for compatibility and convenience of manufacturing and assembling the pipes, respective countries further formulate various pipe specifications of pipe wall thickness and inside diameters according to the same nominal pipe diameter (outside diameter).

To monitor status of the pipes and materials transported by them has been a necessary work, pipe monitoring devices distinguished by installation include insertion type and clamp-on type, the insertion type pipe monitoring device has higher accuracy, but installation time thereof is limited and installation cost thereof is relatively high; the clamp-on type pipe monitoring device has advantages that it can be planned at any time and its installation cost is relatively low, which has become the main development aspect of technology of monitoring pipes.

The clamp-on type pipe monitoring device usually requires information of pipe material, outside diameter, pipe wall thickness, inside diameter, etc. However, mean outside diameters, outside diameter tolerances, pipe wall thicknesses and approximate inside diameters of the pipe specifications in respective country standards are different, to take the mean outside diameters of the pipe names of nominal pipe diameter "1 inch pipe" as an example, CNS pipe is 34 mm, JIS pipe is 32 mm, ASTN pipe is 33.4 mm, DIN pipe is 32 mm; the differences between the various pipe specifications of the pipe name affect the accuracy of monitoring.

A newly built pipe system is easier to obtain correct pipe name and its specification such as material, size, but requirements and communications between a designer, a builder and a user of the pipe system are different (for example, the designer and builder think that the user does not need the information of the pipe wall thickness and the inside diameter, so they do not transfer the information of the pipe to the user), those make the user hard to confirm the information of the pipe after the pipe system was built. For most of the pipe systems in use, although the user can obtain the outside diameter of the pipe by using a measuring tool (such as a measuring tape), the pipes of the same outside diameter are distinguished into different pipe names of specifications in different country standards, if the correct pipe name is unknown, the user will not be able to find out the pipe specification such as pipe wall thickness and inside diameter based on the measured outside diameter. As a result, the user needs to repeatedly try and correct on installing the clamp-on type pipe monitoring devices. Even the monitoring device can output data, if parameters input therein are different from the real specifications, then the accuracy of the measuring data will be greatly affected.

In industrial field, dozens of various monitoring devices were installed on the pipe system of a production line more than ten years ago; with the trend of Industry 4.0, hundreds or even thousands of the monitoring devices are needed to be installed on the pipe system of the same production line. It is impossible to ask the user to have knowledge of determining the pipes and a skill of setting each of the monitoring devices. The more parameters the user needs to measure and input, the more measurement errors and input omissions are prone to occur, thereby affecting the reliability of monitoring.

At present time, there is no device or method for solving the aforesaid problems. Therefore, it is urgent for a technology that can automatically determine the pipe names and even the relative specifications, so as to increase the convenience of installing the clamp-on type monitoring devices and the accuracy of monitoring pipes.

SUMMARY OF THE INVENTION

To resolve the aforesaid problems, the present application provides a device of determining pipes, which includes a memory unit, a processing unit and a communication interface. The memory unit has stored a plurality of pipe names, a plurality of reference pipe outside diameter values and orders of the plurality of pipe names corresponding to the plurality of reference pipe outside diameter values, wherein the orders of the plurality of pipe names are created by inputting the plurality of reference pipe outside diameter values into outside diameter value probability function which is established according to mean outside diameters and outside diameter tolerances of the plurality of pipe names to obtain match probabilities, and ordering the plurality of pipe names corresponding to the plurality of reference pipe outside diameter values according to the match probabilities from high to low. The processing unit is connected to the memory unit, for receiving an outside diameter measuring data of a pipe, comparing the outside diameter measuring data with the plurality of the reference pipe outside diameter values, selecting the order of the plurality of pipe names corresponding to the reference pipe outside diameter value same as the outside diameter measuring data, and generating at least one of the pipe names that match the outside diameter measuring data according to the order of the plurality of pipe names corresponding to the reference pipe outside diameter value same as the outside diameter measuring data. The communication interface is connected to the processing unit, for outputting the pipe name that matches the outside diameter measuring data.

In one embodiment, the outside diameter value probability function is selected from one or more than one of a normal distribution function, a truncated normal distribution function, a uniform distribution function, a truncated skewed distribution function, a skewed distribution function, a Poisson distribution function, a triangular distribution function and a U-shaped distribution function, or a combination thereof.

In one embodiment, the processing unit generates the pipe name that matches the outside diameter measuring data by extracting the pipe name ordered at the first one in the order of the plurality of pipe names corresponding to the reference pipe outside diameter value same as the outside diameter measuring data.

In one embodiment, if all results that the processing unit compares the outside diameter measuring data with the plurality of the reference pipe outside diameter values are not the same, the processing unit generates a notification message of adding a new pipe name; and the communication interface outputs the notification message to prompt a user to add the new pipe name.

In one embodiment, the device of determining pipes further includes a case and a fixture, wherein the memory unit, the processing unit and the communication interface are disposed in the case, and the fixture can detachably fix the case on an outer surface of the pipe.

In one embodiment, the device of determining pipes further includes an outside diameter measuring unit, connected to the processing unit, and having a sensor and a clamp; when the clamp holds an outer surface of the pipe, the sensor can measure a curvature or the outside diameter of the pipe to generate the outside diameter measuring data.

In one embodiment, the sensor is an angular displacement sensor or a linear displacement sensor.

In one embodiment, the device of determining pipes further includes an ultrasonic probe, connected to the processing unit, wherein the memory unit has stored pipe wall thicknesses and thickness tolerances of the plurality of pipe names, when the ultrasonic probe is installed on an outer surface of the pipe, the ultrasonic probe can transmit a sensing signal along a radial direction of the pipe and receive a reflection signal from a wall of the pipe; the processing unit generates a pipe wall thickness measuring data according to the reflection signal, and selects the pipe name that the pipe wall thickness matches the pipe wall thickness measuring data from the pipe names that match the outside diameter measuring data; and the communication interface outputs the pipe name that matches the pipe wall thickness measuring data.

In one embodiment, the device of determining pipes further includes a resistance measuring element, connected to the processing unit, and having two electrodes, wherein the memory unit has stored material resistance values of the plurality of pipe names; when the two electrodes are installed on an outer surface of the pipe, the resistance measuring element generates a resistance measuring data of the pipe; the processing unit selects the pipe name that the material resistance value matches the resistance measuring data from the pipe names that match the outside diameter measuring data; and the communication interface outputs the pipe name that matches the resistance measuring data.

In one embodiment, the device of determining pipes further includes a hardness measuring element, connected to the processing unit, and having a retractable probe, wherein the memory unit has stored material hardness values of the plurality of pipe names; when the retractable probe is pressed against an outer surface of the pipe, the hardness measuring element generates a hardness measuring data of the pipe; the processing unit selects the pipe name that the material hardness value matches the hardness measuring data from the pipe names that match the outside diameter measuring data; and the communication interface outputs the pipe name that matched the hardness measuring data.

The device of determining pipe of the present application establishes the outside diameter value probability function according to the mean outside diameter and outside diameter tolerance of respective pipe names, and calculates the match probabilities of the reference pipe outside diameter values in the outside diameter value probability function, the memory unit stores the pipe names and the order of the pipe names corresponding to the reference pipe outside diameter value, the processing unit compares the outside diameter measuring data with the reference pipe outside diameter values to generate the pipe names that match the outside diameter measuring data, and the communication interface outputs the pipe name that match the outside diameter measuring data, thereby effectively resolving the problems of finding and testing pipe specifications. The device of determining pipes of the present application can be further combined with the elements which can automatically measure the pipe outside diameter, pipe wall thickness, the pipe material or the flow rate in the pipe (such as the outside diameter measuring unit, the ultrasonic probe, the resistance measuring element and the hardness measuring element), the user does not need to measure and input the parameters such as the outside diameter and pipe wall thickness, the processing unit can generate the more accurate pipe names, specifications thereof and the flow rate, and determines abnormal conditions of the self-device and the pipe, so that the technical threshold of setting and operating clamp-on monitoring type devices is reduced and the efficiency and accuracy of measuring the flow rate is improved. A pipe monitoring system based on Internet of Things (IoT) can be configured by combining the device of determining pipes of the present application and the terminal devices, and the pipe monitoring system can effectively obviate the measurement error, input error and monitoring window period, so as to achieve the goals of full-time measurement and real-time monitoring.

BRIEF DESCRIPTION OF THE DRAWINGS

FIG. 6C is a transmission and reception signal diagram of the first ultrasonic probe shown in FIG. 6B;

DETAILED DESCRIPTION OF THE PREFERRED EMBODIMENT

The embodiments of the present application will be described in more detail below with reference to the drawings and element numerals, so that those skilled in the art to which the present application pertains can implement the present invention accordingly after studying the specification.

Figure 1:
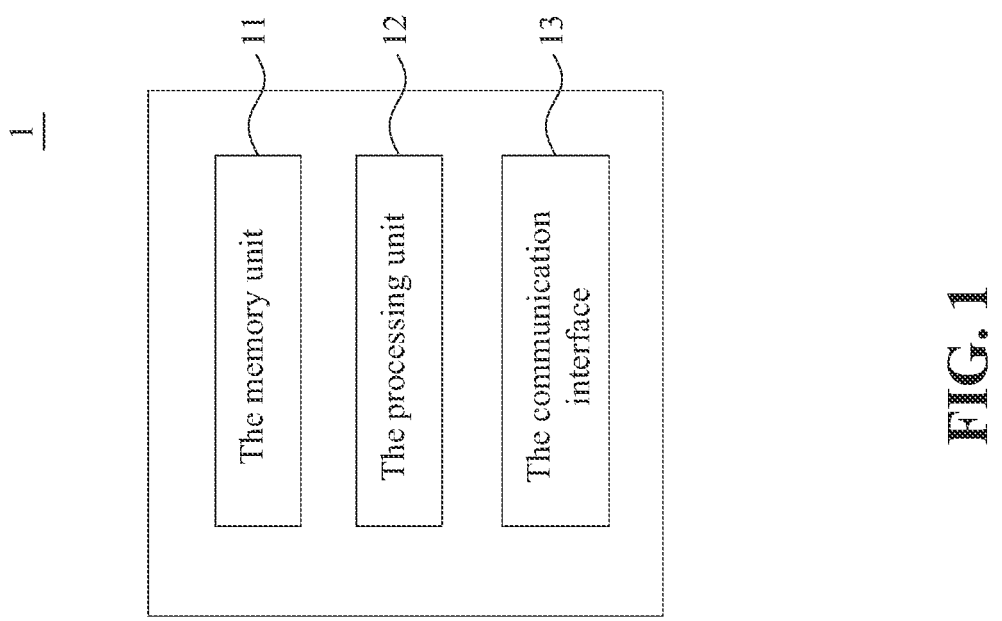
FIG. 1 is a block diagram illustrating a device of determining pipes according to the first embodiment of the present application.

The specific implementation of the device of determining pipes according to the present application can be a stand-alone device installed on the pipe or a remote monitoring computer or server having a pipe sensor connected thereto. FIG. 1 is a block diagram illustrating a device of determining pipes according to the first embodiment of the present application. As shown in FIG. 1, a device of determining pipes 1 includes a memory unit 11, a processing unit 12, a communication interface 13 and a power unit (not shown), the processing unit 12 is respectively connected to the memory unit 11 and the communication 13. The memory unit 12 is a non-volatile memory such as read-only memory, solid-state hard disk, etc. The processing unit is a chip set including a microprocessor, a micro controller, a dynamic random access memory and peripheral circuits, if the device of determining pipes is the stand-alone device, the processing unit 12 can be, for example, a chip model of arduino, 8051, STM32. The communication interface 13 can be a display (e.g. Liquid crystal displays, LED displays, etc.) and/or an external communication circuit including a sensor signal port (e.g. SPI, I2C, or an analog electronic signal). The power unit is a battery and/or a transformer/rectifier circuit and a power connection circuit that can be connected to an external power source, so it can provide the power required for operation of the device of determining pipes.

The memory unit 11 has stored a plurality of pipe names, a plurality of reference pipe outside diameter values and orders of the plurality of pipe names corresponding to the plurality of reference pipe outside diameter values, wherein the plurality of pipe names includes nominal outside diameters and country standards, the orders of the plurality of pipe names are created by inputting the plurality of reference pipe outside diameter values into outside diameter value probability function which is established according to mean outside diameters and outside diameter tolerances of the plurality of pipe names to obtain match probabilities and ordering the plurality of pipe names corresponding to the plurality of reference pipe outside diameter values according to the match probabilities from high to low. A method of creating the orders of the plurality of pipe names by using the stand-alone device of determining pipes includes following steps.

Step 1: the memory unit 11 stored the known pipe names, the mean outside diameter and the outside diameter tolerance of each of the known pipe names, and the outside diameter value probability function (e.g. a normal distribution function).

Step 2: a range of the reference pipe outside diameter values (e.g. 1 mm to 100 mm) and an outside diameter resolution (e.g. 0.1 mm) are input into the processing unit 12 via the communication interface 13 (by a technician).

Step 3: the processing unit 12 generates a sequence of the reference pipe outside diameter values according to the range of the reference pipe outside diameter values and the outside diameter resolution (e.g. 1.0, 1.1, 1.2, . . . , 48.1, 48.2, 48.3, . . . , 99.8, 99.9, 100), the processing unit 12 generates effective outside diameter ranges of all the pipe names according to the mean outside diameters and the outside diameter tolerances of the pipe names (e.g. The mean outside diameter value is taken as a mean value, the outside diameter tolerance multiplied by a proportional coefficient is used as a standard deviation, and the effective outside diameter range equals to the mean value added or subtracted with the standard deviation, i.e. the effective outside diameter range=the mean value±the standard deviation), and then the processing unit 12 can perform Step 3-1 or Step 3-2, wherein Step 3-1: the processing unit 12 compares each the reference pipe outside diameter value of the sequence of the reference pipe outside diameter values with the effective outside diameter ranges of all the pipe names sequentially, sets the pipe names in which the reference outside diameter is fallen within the effective outside diameter ranges as selected pipes, generates match probabilities of the selected pipes of each the reference pipe outside diameter value by inputting each of the reference pipe outside diameter values, the mean values and the standard deviations of the selected pipes of each of the reference pipe outside diameter values into the outside diameter value probability function, orders the selected pipes according to the match probabilities from high to low, and stores an order of the pipe names of the selected pipes corresponding to each of the reference pipe outside diameter values into the memory units 11;

Step 3-2: the processing unit 12 generates match probabilities of all the pipe names of each the reference pipe outside diameter value by inputting each the reference pipe outside diameter value of the sequence of the reference pipe outside diameters, and the mean values and the standard deviations of all the pipe names into the outside diameter value probability function, selects the pipe names whose match probability is higher than the probability threshold (for example: 0.01, 0.05, or 0.1), and orders the selected pipe names according to the match probability from high to low, and stores the order of the selected pipe names corresponding to each the reference pipe outside diameter value into the memory unit 11.

If there is further information on outside diameter distribution of the pipes, the different pipe names can be set to use the different outside diameter value probability functions to calculate the match probabilities. The outside diameter value probability function is selected from one or more than one of a normal distribution function, a truncated normal distribution function, a uniform distribution function, a truncated skewed distribution function, a skewed distribution function, a Poisson distribution function, a triangular distribution function and a U-shaped distribution function, or a combination thereof. Depending on a capacity of the memory unit 11 of the stand-alone device of determining pipes, the outside diameter value probability functions, and the mean values and the outside diameter tolerances of each the pipe name can be deleted through the processing unit 12 after completing the orders of the pipe names of all the reference pipe outside diameter values; or the specification data (such as the pipe wall thickness and tolerance range thereof, pipe material) of each the pipe name can be further stored in the memory unit 11 to facilitate a user to find the specification data of each the pipe name.

In implementation, the memory unit 11 can be partitioned into several memory areas, which includes the memory area of the orders of the pipes names and the memory area of the pipe specifications, wherein the memory area of the orders of the pipe names stores the order of pipe names corresponding to each of all the reference pipe outside diameter values, and the memory area of the pipe specifications stores the pipe specification of each the pipe name. An example of the memory area of the order of pipe names is shown in Table 1, an example of the memory area of the pipe specifications is shown in Table 2.

TABLE 1

| The reference pipe outside diameter value (mm) | The order | The pipe name | Storage address of the pipe specification |
|---|---|---|---|
| 48.1 | 1 | 1½"-CNS-4053-UPVC | 0 × 0100 |
|  | 2 | 1½"-CNS-1302-UPVC | 0 × 0200 |
| 48.2 | 1 | 1½"-ASTM-D1785-sch40 | 0 × 0500 |
|  | 2 | 1½"-CNS-1302-UPVC | 0 × 0100 |
|  | 3 | 1½"-CNS-4053-UPVC | 0 × 0200 |
| 48.3 | 1 | 1½"-ASTM-D1785-sch40 | 0 × 0500 |
|  | 2 | 1½"-CNS-1302-UPVC | 0 × 0100 |
|  | 3 | 1½"-CNS-4053-UPVC | 0 × 0200 |

TABLE 2

| The pipe name | | The pipe specification | | | | | |
|---|---|---|---|---|---|---|---|
| The nominal pipe diameter | The country standard | The pipe material | The mean outside diameter | The outside diameter tolerance | The pipe wall thickness | The pipe wall thickness tolerance | The storage address |
| 1½" | CNS1302 | UPVC | 48 | +0.4 | 3.1 | +0.8~0.0 | 0x0100 |
|  | CNS4053 | UPVC | 48 | +0.3 | 3.7 | +0.6~0.0 | 0x0200 |
|  | JISk6743 | UPVC | 48 | ±0.3 | 3.7 | +0.8~0.0 | 0x0300 |
|  | DIN8062 SDR11 | UPVC | 50 | ±0.2 | 4.6 | +0.7~0.0 | 0x0400 |
|  | ASTMD1785 sch40 | UPVC | 48.26 | ±0.15 | 3.68 | ±0.51~0.0 | 0x0500 |

It is noted that the pipe names and their specifications in various country standards are numerous and constantly updated, by using a built-in input unit (e.g. buttons, touch screens, not shown) or an external input device (e.g. computers, mobile communication device, not shown), the user can transmit data (such as a new or changed pipe name, a new reference pipe outside diameter value and the order of the pipe name corresponding to the reference pipe outside diameter value) to the processing unit 12 through the communication interface 13, and then the processing unit 12 amends or add the data stored in the memory unit 11.

A calculating process of generating the order of pipe names corresponding to the reference pipe outside diameter value 48.2 mm listed in Table 1 by using different outside diameter value probability functions is described as follows: taking the truncated normal distribution function as an example, the truncated normal distribution function of the outside diameter value of each the pipe name is $$g_1(x) = \frac{1}{\sigma} * \frac{\phi\left(\frac{x-\mu}{\sigma}\right)}{\Phi\left(\frac{b-\mu}{\sigma}\right) - \Phi\left(\frac{a-\mu}{\sigma}\right)},$$

wherein a mean value $\mu$ is the mean outside diameter, a standard deviation $\sigma$ is J times of the outside diameter tolerance, a value range of J is [⅙, 1] (J is usually set to ½); in a case that positive and negative values of the outside diameter tolerance are the same, a value range of x is defined as k times of the standard deviation, a lower limit $a=\mu-k*\sigma$, an upper limit $b=\mu+k*\sigma$, $\phi(x)$ is the probability density function, $\Phi(x)$ is the cumulative distribution function, and the formulas of the probability density function and the cumulative distribution function can be found in textbooks of mathematics and statistics. A number of the pipes (defined as candidate pipes) which probably match the specific reference pipe outside diameter value is set as n, the probability distribution function $f_i(x)$ of each of the candidate pipes (1 to n) is equal to $\pi i*g_i(x)$ (i.e. $f_i(x)=\pi_i*g_i(x)$), $\pi_i$ is the weight factor ($\pi_i=1/n$ under no adjustment condition), a total integral value of the probability function integral of all the candidate pipes must be 1 (i.e. $\Sigma_{i=1}{}^n\int\pi i*g(x)dx$). A match probability $p_i$ of any one of the candidate pipes corresponding to the specific reference pipe outside diameter value is equal to $f_i(x)/F(x)$ (i.e. $p_i=f_i(x)/F(x)$), wherein $F(x)=\Sigma_{i=1}{}^n fi(x)$.

The candidate pipes include 1½"—CNS-1302-UPVC, 1½"—CNS-4053-UPVC, 1½"—ASTM-D1785-sch40, and the process of calculating the match probability of each of the candidate pipes are as follows.

1. A probability of the candidate pipe 1½"—CNS-1302-UPVC of the distribution function at the reference pipe outside diameter value 48.2 mm is:

The mean value $\mu=48$;

The standard deviation=0.2 ($J*\sigma$, J is taken as ½, $\sigma=0.4/2$);

The effective outside diameter range x=[48±0.6] ($k*\sigma$, k is taken as 3);

The probability of the truncated normal distribution function $g_1(x=48.2)=1.2133$;

The probability of the candidate pipe of the distribution function $f_1(x=48.2)=\pi_1*g_1(x=48.2)=0.404$ ($\pi_1=1/n$, n is the number of the candidate pipes, n=3).

2. A probability of the candidate pipe 1½"—CNS-4053-UPVC of the distribution function at the reference pipe outside diameter value 48.2 mm is:
   The mean value μ=48;
   The standard deviation=0.1 (J*σ, J is taken as ⅓, σ=0.3/3);
   The effective outside diameter range x=[48±0.3] (k*σ, k is taken as 3);
   The probability of the truncated normal distribution function $g_2(x=48.2)=0.541$;
   The probability of the candidate pipe of the distribution function $f_2(x=48.2)=\pi_2*g_2(x=48.2)=0.180$ ($\pi_2=⅓$).
3. A probability of the candidate pipe 1½"—ASTM-D1785-sch40 of the distribution function at the reference pipe outside diameter value 48.2 mm is:
   The mean value μ=48.26;
   The effective outside diameter range x=[48.26−0.15, 48.26+0.15];
   The probability of the uniform distribution function $g_3(x=48.2)=1/0.3$ (the probability distribution is uniform);
   The probability of the candidate pipe of the distribution function $f_3(x=48.2)=\pi_3*g_3(x=48.2)=1.111$ ($\pi_2=⅓$).
4. A sum of the probabilities of all the candidate pipes of the distribution function, and the match probabilities of each of the candidate pipes are:
   The sum of the probabilities of all the candidate pipes of the distribution function $F(x=48.2)=f_1(x=48.2)+f_2(x=48.2)+f_3(x=48.2)=1.695$;
   Corresponding to the reference pipe outside diameter value 48.2 mm, the match probability $p_1(x=48.2)$ of the candidate pipe 1½"—CNS-1302-UPVC=0.238, $p_1(x=48.2)=f_1(x=48.2)/F(x=48.2)=0.404/1.695=0.238$;
   Corresponding to the reference pipe outside diameter value 48.2 mm, the match probability $p_2(x=48.2)$ of the candidate pipe=0.106, $p_2(x=48.2)=f_2(x=48.2)/F(x=48.2)=0.180/1.695=0.106$;
   Corresponding to the reference pipe outside diameter value 48.2 mm, the match probability $p_3(x=48.2)$ of the candidate pipe=0.655, $p_3(x=48.2)=f_3(x=48.2)/F(x=48.2)=1.111/1.695=0.655$.
5. The order the pipe names (i.e. The candidate pipes) corresponding to the reference pipe outside diameter value 48.2 mm according to the match probabilities from high to low is:
   $1^{st}$: 1½"—ASTM-D1785-sch40,
   $2^{nd}$: 1½"—CNS-1302-UPVC,
   $3^{rd}$: 1½"—CNS-4053-UPVC.

If uncertainty of the outside diameter measuring data is considered, the match probabilities of the candidate pipes corresponding to the reference pipe outside diameter value can be calculated by an interval-integrated probability of the distribution function in a range of the uncertainty. Taking the reference pipe outside diameter value 48.2 mm and its candidate pipes listed in Table 1 as an example again, the measurement uncertainty of the outside diameter measuring data at the reference pipe outside diameter value is preset as ±0.05 mm, and the process of calculating the match probability of each the candidate pipes and the order of the pipe names are as follows.
1. The probability of the candidate pipe 1½"—CNS-1302-UPVC of the distribution function at the reference pipe outside diameter value 48.2 mm and the measurement uncertainty±0.05 mm is:
   The mean value μ=48;
   The standard deviation=0.2 (J*σ, J is taken as ½, σ=0.4/2);
   The effective outside diameter range x=[48±0.6] (k*σ, k is taken as 3);
   The probability of the truncated normal distribution function $g_1(x)=0.121$, x between 48.15 and 48.25;
   The probability of the candidate pipe of the distribution function $f_1(x)=\pi_1*g_1(x)=0.040$ ($\pi_1=1/n$, n is the number of the candidate pipes, n=3).
2. The probability of the candidate pipe 1½"—CNS-4053-UPVC of the distribution function at the reference pipe outside diameter value 48.2 mm and the measurement uncertainty±0.05 mm is:
   The mean value μ=48;
   The standard deviation=0.1 (J*σ, J is taken as ⅓, σ=0.3/3);
   The effective outside diameter range x=[48±0.3] (k*σ, k is taken as 3);
   The probability of the truncated normal distribution function $g_2(x)=0.061$, x between 48.15 and 48.25;
   The probability of the candidate pipe of the distribution function $f_2(x)=\pi_2*g_2(x)=0.020$ ($\pi_2=⅓$).
3. The probability of the candidate pipe 1½"—ASTM-D1785-sch40 of the distribution function at the reference pipe outside diameter value 48.2 mm and the measurement uncertainty±0.15 mm is:
   The mean value μ=48.26;
   The effective outside diameter range x=[48.26−0.15, 48.26+0.15];
   The probability of the uniform distribution function $g_3=0.333$, x between 48.15 and 48.25;
   The probability of the candidate pipe of the distribution function $f_3(x)=\pi_3*g_3(x)=0.111$ ($\pi_3=⅓$).
4. The sum of the probabilities of all the candidate pipes, and the match probabilities of each of the candidate pipes are:
   The sum of the probabilities of all the candidate pipes $F(x)=0.040+0.020+0.111=0.171$; Corresponding to the reference pipe outside diameter value 48.2 mm and the measurement uncertainty±0.05 mm, the match probability $p_1(x)$ of the candidate pipe 1½"—CNS-1302-UPVC=0.234, $p_1(x)=f_1(x)/F(x)=0.040/0.171=0.234$;
   Corresponding to the reference pipe outside diameter value 48.2 mm and the measurement uncertainty±0.05 mm, the match probability $p_2(x)$ of the candidate pipe 1½"—CNS-4053-UPVC=0.117, $p_2(x)=f_2(x)/F(x)=0.020/0.171=0.117$;
   Corresponding to the reference pipe outside diameter value 48.2 mm and the measurement uncertainty±0.05 mm, the match probability $p_3(x)$ of the candidate pipe 1½"—ASTM-D1785-sch40=0.649, $p_3(x)=f_3(x)/F(x)=0.111/0.171=0.649$.
5. The order of the pipe names (i.e. The candidate pipes) corresponding to the reference pipe outside diameter value 48.2 mm and the measurement uncertainty±0.05 mm, according to the match probabilities from high to low is:
   $1^{st}$: 1½"—ASTM-D1785-sch40,
   $2^{nd}$: 1½"—CNS-1302-UPVC,
   $3^{rd}$: 1½"—CNS-4053-UPVC.

The processing unit 12 receives the outside diameter measuring data (e.g. 48.2 mm) of a pipe from the user or a sensor, compares the outside diameter measuring data with the plurality of the reference pipe outside diameter values, selects the order of the pipe names corresponding to the reference pipe outside diameter value same as the outside diameter measuring data (48.2 mm), and generates at least one of the pipe names that match the outside diameter measuring data according to the order of the pipe names corresponding to the reference pipe outside diameter value same as the outside diameter measuring data, for example:

the 1st pipe name, the 1st to the 3rd pipe names or all the pipe names in the order. The communication interface 13 outputs the pipe name that matches the outside diameter measuring data to a computer of the user or a display for displaying the pipe names via a wired or wireless network for the user to identify, select or further process the pipe names. If the processing unit 12 does not find out the pipe name that matches the outside diameter measuring data, the processing unit 12 generates a notification page for adding new pipe specification, and the communication interface 13 outputs the notification page to notice the user to add a new pipe name and specification thereof. When the user inputs the new pipe name through the communication interface 13 (e.g. a display panel with touch function) or an input unit (e.g. button, keyboard, not shown), the processing unit 12 rewrites the outside diameter measuring data as a new reference pipe outside diameter value, and controls the memory unit 11 store the new pipe name corresponding to the new reference pipe outside diameter value.

The present application provides another device of determining pipes, which includes a memory unit, a processing unit and a communication unit. The memory unit has stored a plurality of pipe names, a plurality of reference pipe outside diameter values and match probabilities of the plurality of pipe names corresponding to the plurality of reference pipe outside diameter values, wherein the match probabilities of the plurality of pipe names are obtained by inputting the plurality of reference pipe outside diameter values into outside diameter value probability function which is established according to mean outside diameters and outside diameter tolerances of the plurality of pipe names. The processing unit is connected to the memory unit, receives an outside diameter measuring data of a pipe, compares the outside diameter measuring data with the plurality of the reference pipe outside diameter values, selects the match probabilities of the plurality of pipe names corresponding to the reference pipe outside diameter value same as the outside diameter measuring data, and generates at least one of the pipe names that match the outside diameter measuring data according to the match probabilities of the plurality of pipe names corresponding to the reference pipe outside diameter value same as the outside diameter measuring data. The communication interface is connected to the processing unit, and outputs the pipe name that matches the outside diameter measuring data.

As aforesaid Step 3-1 and Step 3-2 of the method of creating the orders of the plurality of pipe names, the processing unit can calculate the match probabilities of all the candidate pipes or the candidate pipes which the reference outside diameter value is fallen within their effective outside diameter range, then exclude the pipe names of the match probabilities lower than a probability threshold (e.g. 0.01, 0.05 or 0.1), and control the memory unit store the pipe names and their match probabilities, which are not lower than the probability threshold, corresponding to the reference pipe outside diameter value. In considering that the pipe of specific specification will be used in a specific region or industry, in order to improve efficiency and accuracy of determining the pipe names, the memory unit of this embodiment can further store weighting factors of the pipe names corresponding to the reference pipe outside diameter value; the processing unit selects the match probabilities of the pipe names corresponding to the reference pipe outside diameter value same as the outside diameter measuring data, and generates at least one of the pipe names that match the outside diameter measuring data according to the match probabilities and weighting factors of the plurality of pipe names corresponding to the reference pipe outside diameter value same as the outside diameter measuring data.

If the processing unit does not find out the pipe name that matches the outside diameter measuring data, the processing unit generates a notification page for adding new pipe specification, and the communication interface outputs the notification page to notice the user to add a new pipe name and specification thereof. When the user inputs the new pipe name or both the new pipe name and its specification through the communication interface or the input unit, the processing unit rewrites the outside diameter measuring data as a new reference pipe outside diameter value, and controls the memory unit store the new pipe name corresponding to the new reference pipe outside diameter value.

Based on the aforesaid distribution functions of the candidate pipes and the reference pipe outside diameter value listed in Table 1 and Table 2, the match probabilities and weighting factors corresponding to the reference pipe outside diameter value stored in the memory unit as shown in Table 3.

TABLE 3

| The reference pipe outside diameter value (mm) | The pipe names | The match probability * The weighting factor | The storage address of the pipe specification |
|---|---|---|---|
| 48.2 | 1½"-ASTM-D1785-sch40 | 0.649 * $a_1$ | 0 × 0500 |
|  | 1½"-CNS-1302-UPVC | 0.238 * $a_2$ | 0 × 0100 |
|  | 1½"-CNS-4053-UPVC | 0.117 * $a_3$ | 0 × 0200 |

TABLE 4

| The weighting factor | The region of use | | The industry | |
|---|---|---|---|---|
| $a_1 = a_{11} * a_{12}$ | Taiwan | U.S.A. | Semiconductors | Others |
|  | $a_{11} < 1$ | $a_{11} > 1$ | $a_{12} > 1$ | $a_{12} = 1$ |
| $a_2 = a_{21} * a_{22}$ | Taiwan | U.S.A. | Semiconductors | Others |
|  | $a_{21} = 1$ | $a_{21} < 1$ | $a_{22} = 1$ | $a_{22} = 1$ |
| $a_3 = a_{31} * a_{32}$ | Taiwan | U.S.A. | Semiconductors | Others |
|  | $a_{31} > 1$ | $a_{31} < 1$ | $a_{32} = 1$ | $a_{32} = 1$ |

Each the weighting factor is preset as 1, after the processing unit received the outside diameter measuring data, the processing unit generates a field message "Other information", the communication interface outputs the field "Other information" for the user to input the information such as the region of use, industry, etc. If the user does not input any information, the processing unit generates the pipe name that matches the outside diameter measuring data according to the originally stored match probabilities of the pipe names corresponding to the reference pipe outside diameter value by the highest or high to low. If the user inputs any information, the processing unit changes the value of the weighting factors corresponding to the information input by the user, calculates a product of the match probabilities and the changed weighting factor, adjusts the match probabilities of the pipe names, and generates the pipe name that matches the outside diameter measuring data according to the adjusted match probabilities of the pipe names. By using the weighting factor corresponding to the information such as the region of use or the industry to adjust the match probabilities of the pipe names, the efficiency and accuracy of determining the pipes can be further improved.

Figure 2A:
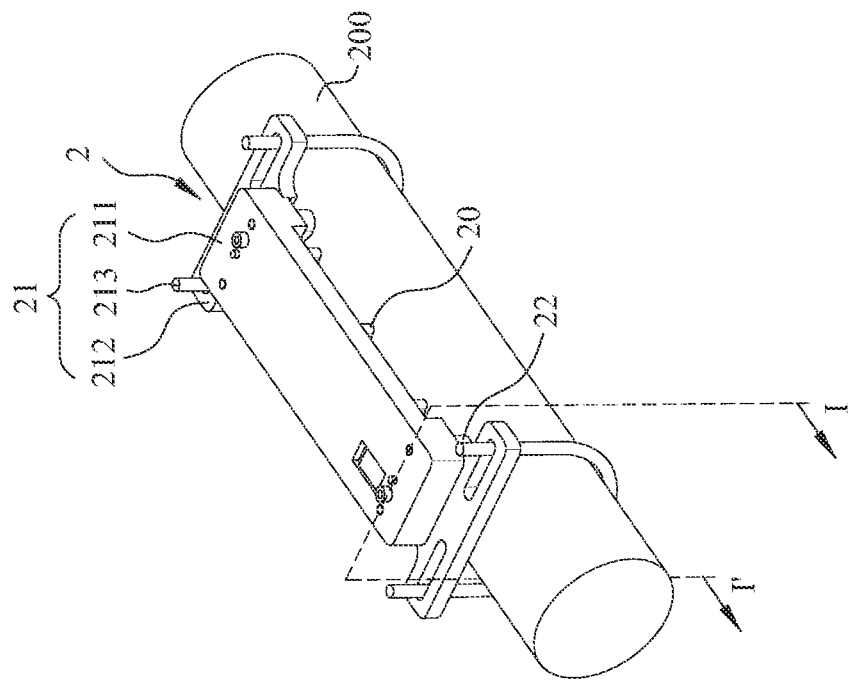
FIG. 2A is a three-dimensional view illustrating a device of determining pipes according to a second embodiment of the present application.
Figure 2A:
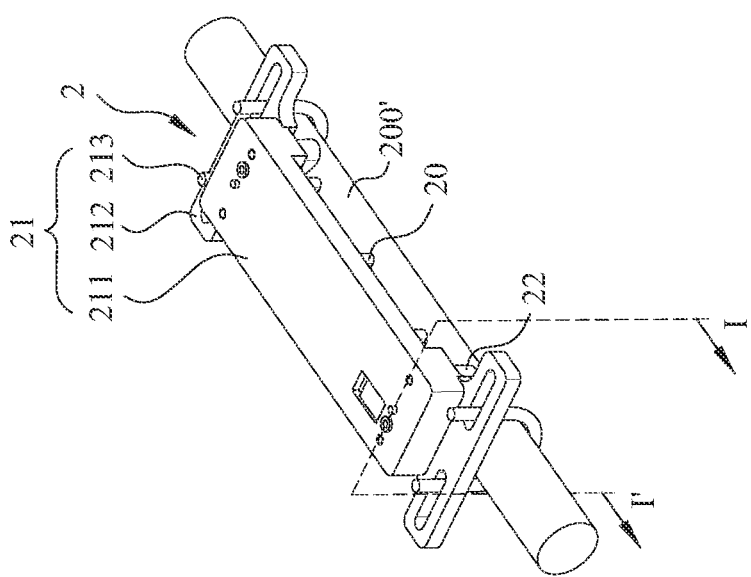
Figure 2B:
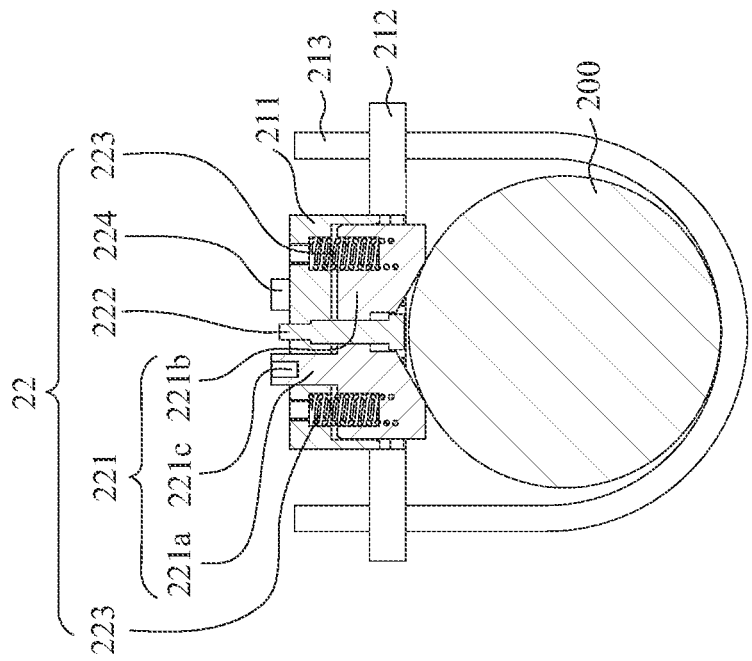
FIG. 2B is a cross-sectional view illustrating I-I' section of the device of determining pipes shown in FIG. 2A.
Figure 2B:
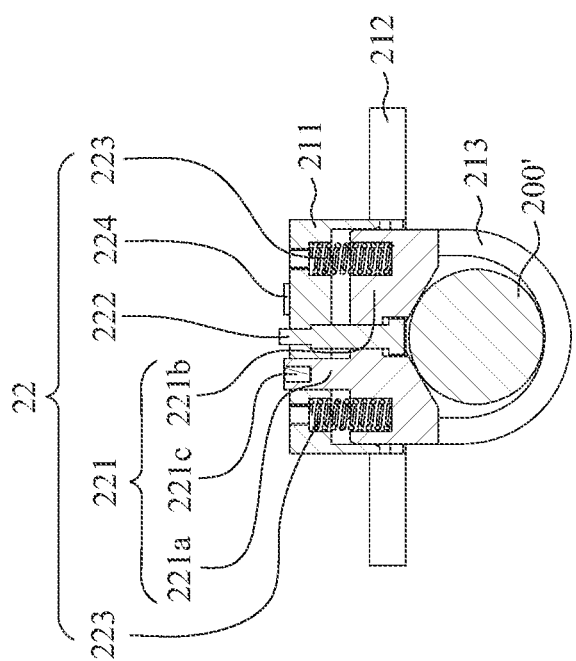

FIG. 2A is a three-dimensional view illustrating a device of determining pipes according to a second embodiment of the present application, FIG. 2B is a cross-sectional view illustrating I-I' section of the device of determining pipes shown in FIG. 2A. As shown in FIG. 2A, a device of determining pipes 2 includes a case 20, a fixture 21, an outside diameter measuring unit 22, the memory unit, the processing unit, the communication interface and the power unit (not shown), wherein the memory unit, the processing unit, the communication interface and the power unit are disposed in the case 20. The fixture 21 includes a carrier 211, a fixing seat 212 located on opposite two sides of the carrier and U-shaped screws 213, the case 20 and the outside diameter measuring unit 22 are installed in the carrier 211. The user selects the U-shaped screws 213 adapted to an outside diameter of a pipe 200 (200') to cross an outer surface of the pipe 200 (200') and to penetrate openings of the fixing seat 212, fastens the U-shaped screws 213 and the fixing seat 212 with nuts (not shown), and thus the device of determining pipes 2 is fixed on the outer surface of the pipe 200 (200').

As shown in FIG. 2B, the outside diameter measuring unit 22 includes a clamp 221, a stopper 222, two springs 223 and a linear displacement sensor 224. The clamp 221 has a shaft portion 221a, an inverted V-shaped sidewall 221b and an induction block 221c, a side of the shaft portion 221a is embedded in a guide channel of the carrier 211, grooves are formed in two sides of the inverted V-shaped sidewall 221b respectively, a through hole is formed in the center of the inverted V-shaped sidewall 221b, and the induction block 221c is made by a magnetically inductive material or magnet and disposed in the side of the shaft portion 221a that is embedded in the carrier 211. One end of the stopper 222 is engaged with a limit groove of the carrier 211, and the other end of the stopper 222 penetrates the clamp 221 and is flush with the through hole in the center of the inverted V-shaped sidewall 221b. Two ends of the two springs 223 are respectively fixed to the grooves of the carrier 221 and the grooves of the inverted V-shaped sidewall. The linear displacement sensor 224 (e.g. A magnetostrictive displacement sensor) is installed in a position of the carrier 211 adjacent to the induction block 221c and connected to the processing unit. It is noted that a number of the springs 223 is not limited to two, single spring 223 can be used in other embodiments, and two ends of the single spring 223 are respectively fixed to the carrier 211 and the groove of the inverted V-shaped sidewall that is away from the induction block 221c, and the linear displacement sensor 224 is installed in the groove of the inverted V-shaped sidewall that is adjacent to the induction block 221c, all the embodiments can achieve the function of measuring the pipe outside diameter.

Before the device of determining pipes 2 is installed on the pipe 200 (200'), an elastic force of the spring 233 pushes the inverted V-shaped sidewall 221b of the clamp 221 to a position protruding from the carrier 221. When the device of determining pipes 2 is installed on the pipe 200 (200'), the inverted V-shaped sidewall is abutted to the outer surface of the pipe 200 (200'), with the outside diameters of the pipes 200, 200' are different, the outer surfaces of the pipe 200, 200' will abut to different positions of the inverted V-shaped sidewall 221b; that is, the larger the outside diameter of the pipe is, the position where the outer surface of the pipe abuts the inverted V-shaped sidewall will be closer to an opening of the inverted V-shape. While the pipe 200 (200') and the fixing seat 212 are tighten with the U-shaped screws 213 and nuts, the clamp 221 moves towards the carrier 221 (the shaft portion 221a moves along the guide channel of the carrier 221 to protrude from a surface of the carrier 211, and the inverted V-shaped sidewall 221b retracts into the carrier 221) till the stopper 222 blocks the outer surface of the pipe 200 (200'). The elastic force of the spring 223 ensure there is no gap between the outer surface of the pipe 200 (200') and the inverted V-shaped sidewall 221b. The linear displacement sensor 224 can automatically measure a moving distance (radial displacement defined as the outside diameter measuring data) of the induction block 221c installed in the shaft portion 221a. Because the sizes of the outside diameters of the pipes 200, 200' have a linear correspondence with the radially moving distance of the clamp 221, the linear displacement sensor 224 can store a conversion data of the radially moving distance of the clamp 221 to the sizes of the outside diameters of the pipes; when the linear displacement sensor 224 measured the radially moving distance of the clamp 221, and then an outside diameter measuring data can be generated. After the processing unit received the outside diameter measuring data from the outside diameter measuring unit 22, the processing unit compares the outside diameter measuring data with the reference pipe outside diameter values, selects the order of the pipe names corresponding to the reference pipe outside diameter value same as the outside diameter measuring data, and generates at least one of the pipe names that match the outside diameter measuring data according to the order of the pipe names corresponding to the reference pipe outside diameter value same as the outside diameter measuring data. The communication interface outputs the pipe name that matches the outside diameter measuring data to the user for identification, selection or further processing. If the memory unit has further stored the pipe specifications (including pipe materials, pipe wall thickness and the like) corresponding to the pipe names, the processing unit can generate the pipe name and the pipe specification thereof that matches the outside diameter measuring data, the communication interface can output the pipe name and the pipe specification thereof that matches the outside diameter measuring data to the user for processing and utilization.

Figure 3A:
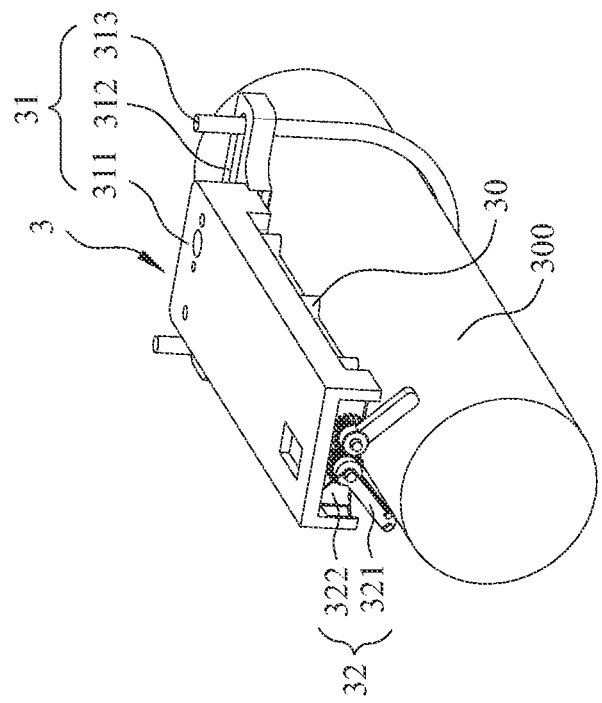
FIG. 3A is a three-dimensional view illustrating a device of determining pipes according to a third embodiment of the present application.
Figure 3A:
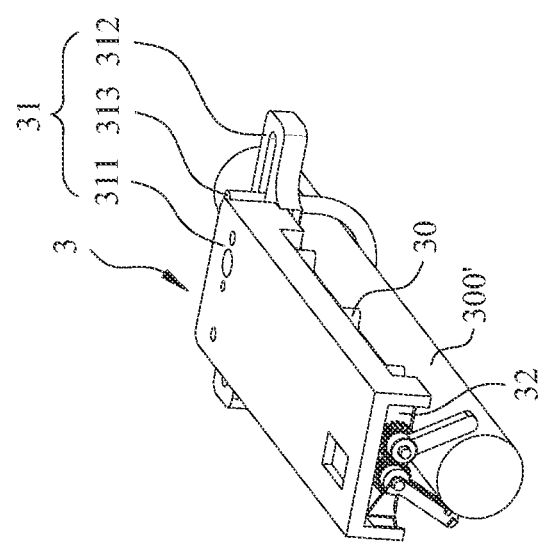
Figure 3B:
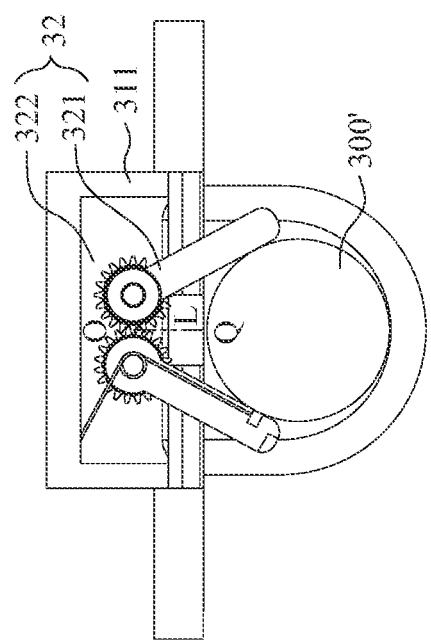
FIG. 3B is a cross-sectional view of the device of determining pipes shown in FIG. 3A along a radial direction of the pipe.
Figure 3B:
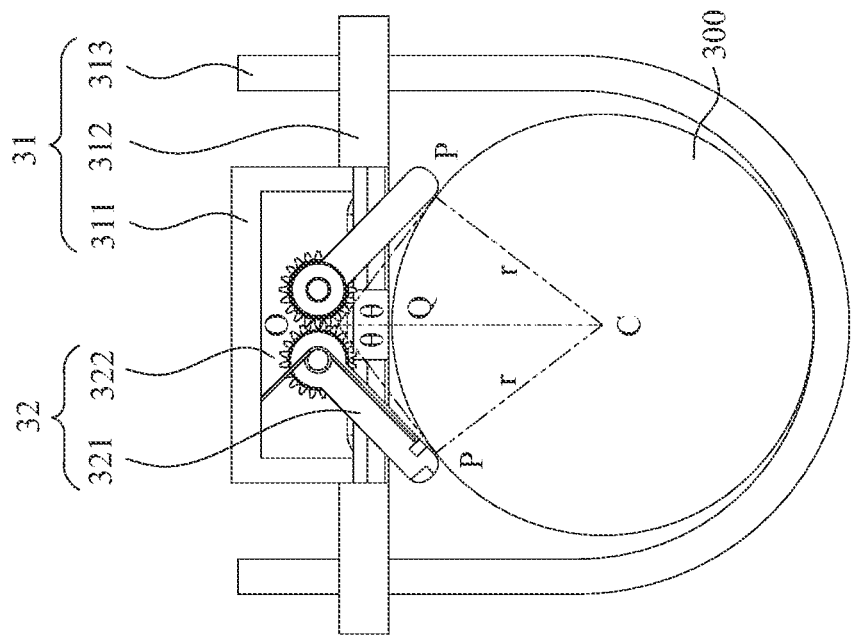

FIG. 3A is a three-dimensional view illustrating a device of determining pipes according to a third embodiment of the present application, FIG. 3B is a cross-sectional view of the device of determining pipes shown in FIG. 3A along a radial direction of the pipe. As shown in FIG. 3A, a device of determining pipes 3 includes a case 30, a fixture 31, an outside diameter measuring unit 32, the memory unit, the processing unit, the communication interface and the power unit (not shown), wherein the memory unit, the processing unit, the communication interface and the power unit are disposed in the case 30. The fixture 31 includes a carrier 311, a fixing seat 312 located on opposite two sides of the carrier and U-shaped screws 313 (one side shown, the other side not shown), the case 30 and the outside diameter measuring unit 32 are installed in the carrier 311. The user selects the U-shaped screws 313 adapted to the outside diameter of the pipe 300 (300') to cross an outer surface of a pipe 300 (300') and to penetrate openings of the fixing seat 312, fastens the U-shaped screws 313 and the fixing seat 312 with nuts (not shown), and thus the device of determining pipes 3 is fixed on the outer surface of the pipe 300 (300').

As shown in FIG. 3B, the outside diameter measuring unit 32 is connected to the processing unit, and includes a clamp 321 and an angular displacement sensor 322, wherein the clamp 321 has two arms, two ends of the two arms are meshed with a gear (the meshed position defined as a vertex O), the other two ends of the two arms can be opened and closed according the sizes of the outside diameters of the pipes 300, 300'. When the two arms are abutted an outer surface of the pipe 300 (300') (the abutted position defined as an oblique tangent point P), and the pipe 300 (300') and the fixing seat 312 are fasten with the U-shaped screws 313 and nuts to allow the outer surface of the pipe 300 (300') tightly contact a bottom of the outside diameter measuring unit 32 (the contacted position defined a vertical tangent point Q), the angular displacement sensor 322 can automatically measure a included angle of the opening of the two arms (the included angle Θ between a connecting line from the vertex O to the oblique tangent point P and a connecting line from the vertex O to the vertical tangent point Q is defined as a curve degree) and then the outside diameter measuring unit 32 generates the outside diameter measuring data. Because the radius r of the outer surface of the pipe 300 (300') is sine of a distance from the vertex O to the center C through the vertical tangent point Q(r=$\overline{OQ}$*sin Θ, wherein a length $\overline{OQ}$ is a sum of the distance L and the radius r (L is the distance from the vertex O to the vertical tangent point Q), the memory unit can store the distance L from the vertex O to the vertical tangent point Q in advance, the processing unit can calculate the radius r and the outside diameter 2r of the pipe 300 (300') based on the formula r=L*sin Θ/(1−sin Θ), after the processing unit received the curve degree of the outside diameter of the pipe from the outside diameter measuring unit 32, and then it can generate the pipe name that matches the outside diameter measuring data according to the aforesaid steps of the first embodiment. The communication interface outputs the pipe name that matches the outside diameter data to the user for identification, selection or further processing.

Figure 4A:
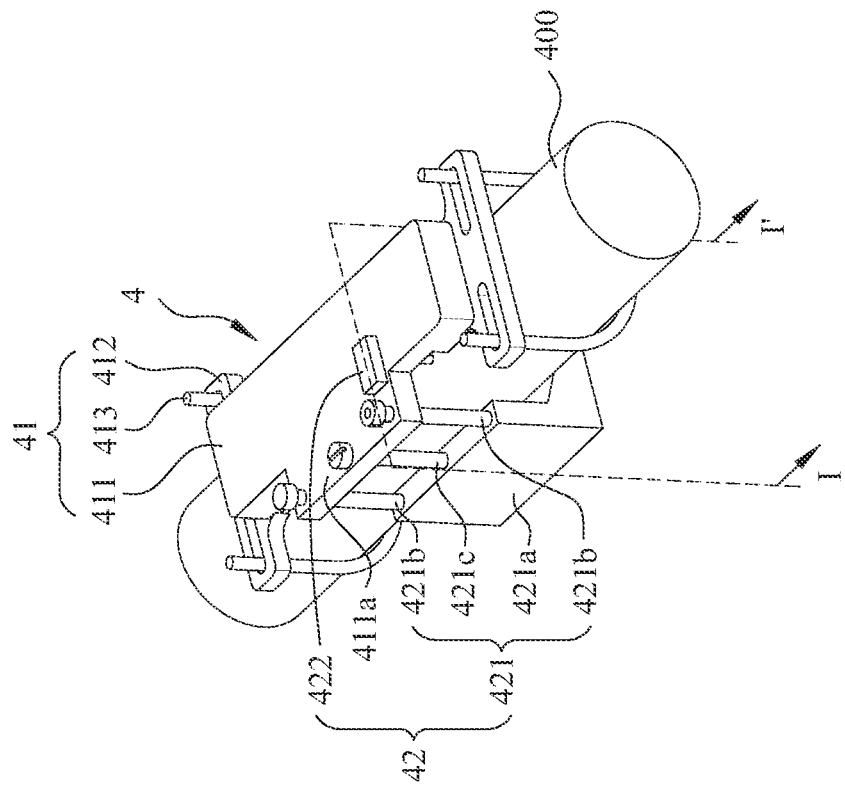
FIG. 4A is a three-dimensional view illustrating a device of determining pipes according to a fourth embodiment of the present application.
Figure 4A:
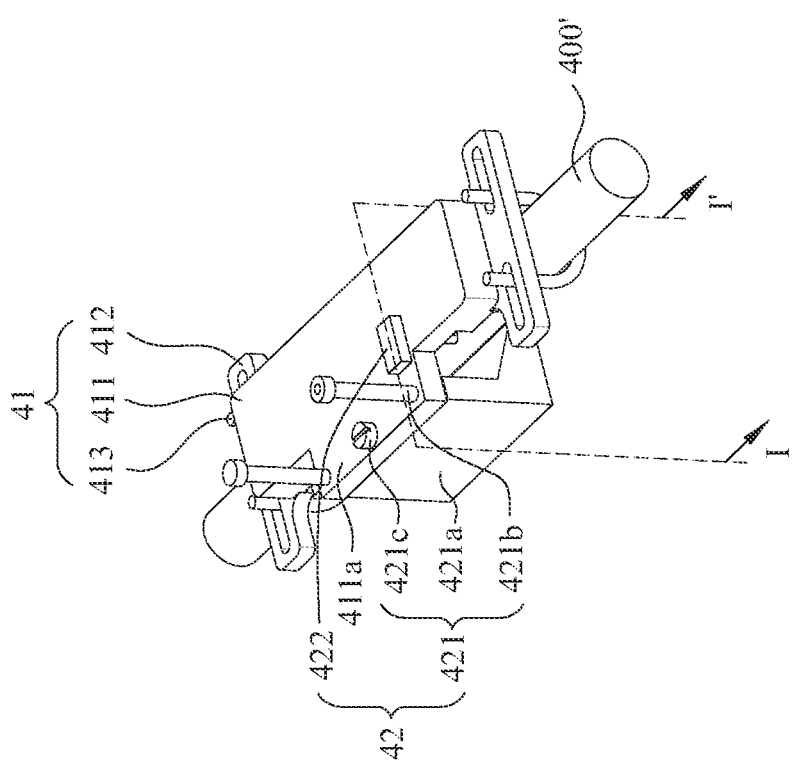
Figure 4B:
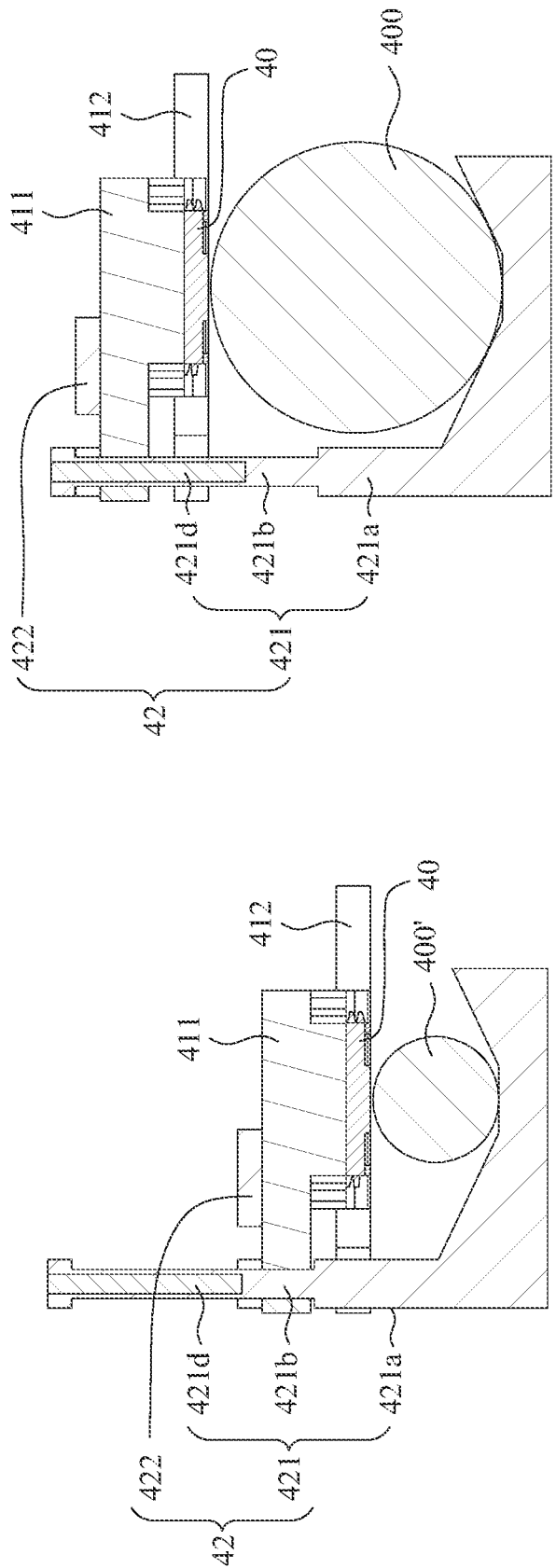
FIG. 4B is a cross-sectional view illustrating I-I' section of the device of determining pipes shown in FIG. 4A.

FIG. 4A is a three-dimensional view illustrating a device of determining pipes according to a fourth embodiment of the present application, FIG. 4B is a cross-sectional view illustrating I-I' section of the device of determining pipes shown in FIG. 4A. As shown in FIG. 4A, a device of determining pipes 4 includes a case 40, a fixture 41, an outside diameter measuring unit 42, the memory unit, the processing unit, the communication interface and the power unit (not shown), wherein the memory unit, the processing unit, the communication interface and the power unit are disposed in the case 40. The fixture 41 includes a carrier 411, a fixing seat 412 located on opposite two sides of the carrier and U-shaped screws 413, the case 40 is installed in the carrier 411, and a side of the outside diameter measuring unit 42 is connected to a protruding plate 411a of the carrier 411. The user selects the U-shaped screws 413 adapted to an outside diameter of a pipe 400 (400') to cross an outer surface of the pipe 400 (00') and to penetrate openings of the fixing seat 412, fastens the U-shaped screws 413 and the fixing seat 412 with nuts (not shown), and thus the device of determining pipes 4 is fixed on the outer surface of the pipe 400 (400').

As shown in FIG. 4B, the outside diameter measuring unit 42 includes a clamp 421 and an optical displacement sensor 422, wherein the clamp 421 has an L-shaped base 421a, two support arms 421b, a adjusting screw 421c and an optical ruler 421d, wherein the optical ruler 421d is disposed in one of the support arms 421b, the optical displacement sensor is disposed on a surface of the carrier 411 adjacent to the position of the optical ruler 421d, and the optical displacement sensor 422 is connected to the processing unit. In this embodiment, the user can place the pipe 400 (400') on the L-shaped base 421a, rotate the adjusting screw 421c to allow the case 40 and the L-shaped base clamp the upper and lower surface of the pipe 400 (400'), and fasten the U-shaped screws 413 and the fixing seat 412 with the nuts (not shown), and thus the device of determining pipes 4 is fixed on the outer surface of the pipe 400 (400'). During rotating the adjusting screw 421c to allow the case 40 and the L-shaped base 421b clamp the upper and lower surface of the pipe 400 (400'), the optical displacement sensor 422 and the optical ruler 421d move with the carrier 411 along a radical direction of the pipe 400 (400'), the optical ruler 421d has an optical scale corresponding to the displacement distance, the optical displacement sensor 422 captures an scale image on the optical ruler 421d, thereby generating the outside diameter measuring data. After the processing unit received the outside diameter measuring data from the outside diameter measuring unit 42, the processing unit generates the pipe name that matches the outside diameter measuring data according to the aforesaid steps of the first embodiment, and the communication interface outputs the pipe name that matches the outside diameter measuring data to the user for identification, selection or further processing.

The aforesaid device of determining pipes can be combined with other sensing elements to further improve the accuracy of determining pipes. In another embodiment of the present application, a device of determining pipes includes the memory unit, the processing unit, the communication interface, the power unit and a resistance measuring element, wherein the processing unit is connected to the memory unit, the communication interface and the resistance measuring element, and the memory unit has stored the pipe names, the orders of the pipe names and resistance values of pipe materials. The resistance values of various pipe materials can be obtained from public technical information. In this embodiment, the resistance measuring element has two electrodes, of which structure and function are similar to an existing digital multi-meter that can measure current/resistance/voltage. When the two electrodes are installed on the outer surface of the pipe, the resistance measuring element can generate a resistance measuring data of the pipe. The processing unit generates the pipe names that match the outside diameter measuring data as the description of the first embodiment, then receives the resistance measuring data from the resistance measuring element, and selects the pipe name that matches the resistance measuring data from the pipe names that match the outside diameter. The communication interface outputs the pipe name that matches the outside diameter measuring data and the resistance measuring data. By measuring the resistance of the pipe material, the device of determining pipes can clearly distinguish the pipe specification of different materials (e.g. PVC pipes and stainless steel pipes) having the same outside diameter. Main reasons that the processing unit cannot find out the pipe name whose resistance value of pipe material matches the resistance measuring data are the electrode not contacted the outer surface of the pipe, other element being abnormal or a new pipe; in such case, the processing unit generates a check signal, and the communication interface notices the user to check the device of determining pipes, or to add a new pipe name and its specification.

In another embodiment of the present application, a device of determining pipes includes the memory unit, the processing unit, the communication interface, the power unit and a hardness measuring element, wherein the processing unit is connected to the memory unit, the communication interface and the hardness measuring element, and the memory unit has stored the pipe names, the orders of the pipe names and hardness values of pipe materials. The hardness of the pipe is related to the material and thickness (the hardness of metal is higher than that of plastic, and the hardness of a thick pipe is higher than that of a thin pipe), and the hardness values of various pipe materials can be obtained from public technical information. In this embodiment, the hardness measuring element has a retractable probe, which structure and function are similar to the existing digital hardness tester capable of measuring hardness of products. When the probe is pressed against the outer surface of the pipe, the hardness measuring element generates a hardness measuring data of the pipe. The processing unit generates the pipe names that match the outside diameter measuring data as the description of the first embodiment, then receives the hardness measuring data from the hardness measuring element, and selects the pipe name that matches the hardness measuring data from the pipe names that match the outside diameter measuring data. The communication interface outputs the pipe name that matches the outside diameter measuring data and the hardness measuring data. By measuring the hardness of the pipe material, the device of determining pipes can clearly distinguish the pipe specification of different materials or thicknesses (e.g. PVC pipes and stainless steel pipes, thick pipes and thin pipes) having the same outside diameter. Main reasons that the processing unit cannot find out the pipe name whose hardness value of pipe material matches the hardness measuring data are the probe not contacted the outer surface of the pipe, other element being abnormal or a new pipe; in such case, the processing unit generates a check signal, and the communication interface notices the user to check the device of determining pipes, or to add a new pipe name and its specification.

Figure 5A:
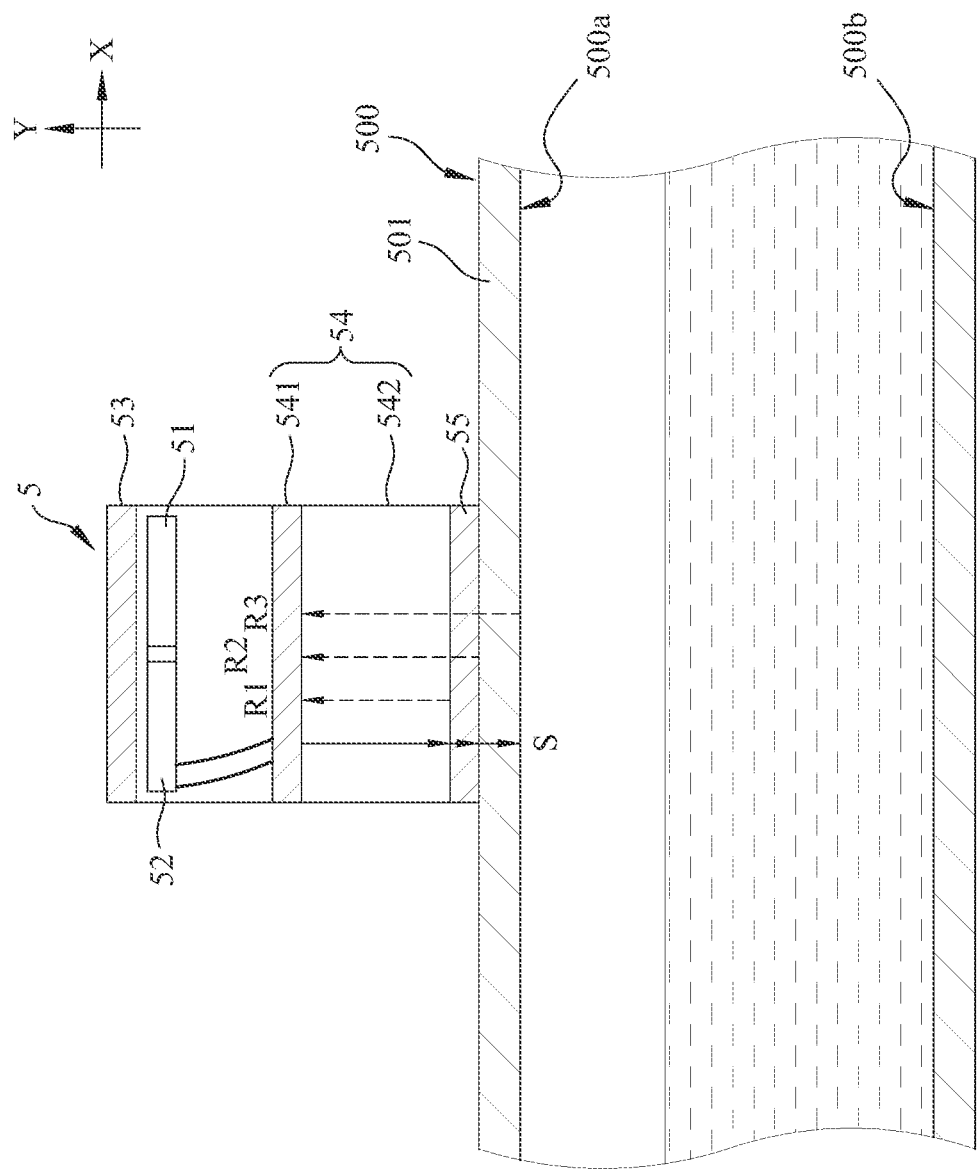
FIG. 5A is a cross-sectional view illustrating a device of determining pipes according to a fifth embodiment of the present application along an axial direction of the pipe.
Figure 5B:
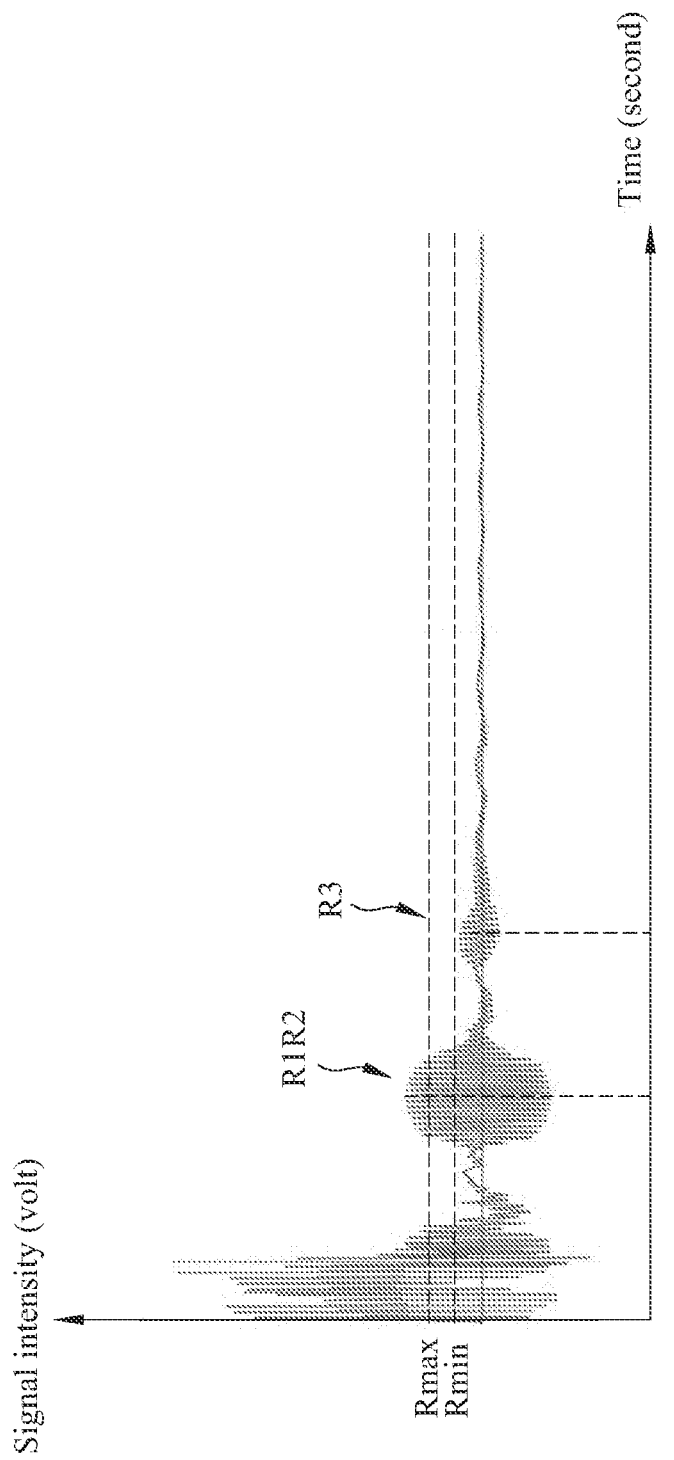
FIG. 5B is a measuring pipe wall thickness signal diagram of the device of determining pipes shown in FIG. 5A.

FIG. 5A is a cross-sectional view illustrating a device of determining pipes according to a fifth embodiment of the present application along an axial direction of the pipe, FIG. 5B is a measuring pipe wall thickness signal diagram of the device of determining pipes shown in FIG. 5A. As shown in FIG. 5A, a device of determining pipes 5 is installed on an outer surface of a pipe 500, and includes a memory unit 51, a processing unit 52, a communication interface 53, an ultrasonic probe 54, an ultrasonic coupling layer 55 and the power unit (not shown), wherein the processing unit 52 is connected to the memory unit 51, the communication interface 53 and the ultrasonic probe 54 respectively, and the ultrasonic coupling layer 55 is sandwiched between the ultrasonic probe 54 and the outer surface of the pipe 500. The structures and functions of the memory unit 51, the processing unit 52 and the communication interface 53 are same as the description of the first embodiment, and the ultrasonic probe 51 includes a piezoelectric material layer 541 for transmitting and receiving ultrasonic signals and an acoustic impedance matching layer 542 for reducing ultrasonic energy loss.

During transmission of the ultrasonic signal through mediums, the less void of an interface between the two mediums is, the weaker reflection of the ultrasonic signal will be at the interface between the two mediums. A material of the ultrasonic coupling layer 55 (e.g. silicone oil, silicone gel, rubber) can greatly eliminate the void between the ultrasonic probe 54 and the outer surface of the pipe, so as to improve an energy ratio of the ultrasonic signal passing through a pipe wall 501 of the pipe. The acoustic impedance of the pipe wall 501 is very different from that of liquid or air in the pipe 500, the interface between the gas or liquid and an inner surface 500a of the pipe 500 adjacent to the ultrasonic probe 54 will reflect a certain proportion of the ultrasonic signal.

In this embodiment, the memory unit 51 has stored the pipe names and pipe wall thicknesses and pipe wall thickness tolerances thereof, the processing unit 52 presets a sound velocity Vp of the pipe material (the sound velocity of a specific material or an average sound velocity of common pipe materials can be selected), a minimum threshold of ultrasonic reflection signal Rmin and a maximum threshold of ultrasonic reflection signal Rmax. When the processing unit 52 receives the outside diameter measuring data of the pipe from the user or the outside diameter measuring unit (as shown in FIGS. 2A, 2B, 3A, 3B, 4A, 4B), the processing unit 52 compares the outside diameter measuring data with the reference pipe outside diameter values, selects the order of the pipe names corresponding to the reference pipe outside diameter value same as the outside diameter measuring data, and generates at least one of the pipe names that match the outside diameter measuring data. After the pipe name that matches the outside diameter measuring data was generated, the processing unit 52 controls the ultrasonic probe 54 transmit a sensing signal S (indicated by the solid arrow symbol in FIG. 5A) along a radial direction of the pipe 500 (indicated by Y-axis in FIG. 5A) and receive a reflection signal R1 of an interface between the acoustic impedance layer 542 and the ultrasonic coupling layer 55, a reflection signal R2 of an interface between the ultrasonic coupling layer 55 and the outer surface of the pipe 500, and a reflection signal R3 (indicated by the dotted arrow symbol in FIG. 5A) of an interface between the inner surface 500a of the pipe and the air or liquid in the pipe 500.

Then, as shown in FIGS. 5A and 5B, the processing unit 52 presets an initial time point T0 of the ultrasonic probe 54 transmitting the sensing signal, switches the ultrasonic probe 54 to receive the reflection signal after the sensing signal transmitted for a few microseconds (e.g. 5-15 microseconds). In time sequence, the reflection signals R1 and R2 are closely connected and have a very small time difference (about 1-10 microseconds) with the reflection signal R3; therefore, the reflection signals R1, R2 and the reflection signal R3 can be distinguished into two adjacent groups of continuous waveform signals. The processing unit 52 compares the signal received by the ultrasonic probe 54 with the minimum threshold of ultrasonic reflection signal Rmin, if there is a peak value of the continuous waveform signal greater than the minimum threshold of ultrasonic reflection signal Rmin, the processing unit determines it being the reflection signal. The processing unit 52 analyzes the two groups of continuous waveform signals, defines the first group of continuous waveform signal as the reflection signals R1, R2 and the second group of continuous waveform signal as the reflection signal R3. The processing unit 52 defines a time point that the highest peak value of the first group of continuous waveform signal appears as a time point T1 of the ultrasonic probe 54 receiving the reflection signal R2 and a time point that the highest peak value of the second group of continuous waveform signal appears as a time point T2 of the ultrasonic probe receiving the reflection signal R3, and then generates a flight time (T0 to T2) that the sensing signal S and the reflection signal R3 go to and fro the piezoelectric material layer 541 and the pipe wall 501 along the radial direction of the pipe 500. A distance that the sensing signal S and the reflection signal R1, R2 go to and fro along the radial direction of the pipe 500 (i.e. two times of a distance between the piezoelectric material layer 541 and the ultrasonic coupling layer 55) and the sound velocity can be obtained through theoretical calculation or measuring in advance; that is, the flight time that the sensing signal S and the reflection signal R1, R2 is known data, the processing unit 52 subtracts the flight time (T0 to T1) with the flight time (T0 to T2), to obtain a flight time (T1 to T2) that the sensing signal S and the reflection signal R3 go to and fro the pipe wall 501. The processing unit 52 generates the pipe wall thickness measuring data d (d=(Vp*(T2−T1))/2) according to ½ of a product of the preset sound velocity Vp and the flight time (T1 to T2) that the ultrasonic signal goes to and fro the pipe wall 501. The processing unit 52 selects the pipe name that matches the pipe wall thickness measuring data from the pipe names that match the outside diameter measuring data, and the communication interface 53 outputs the pipe name that matches the pipe wall thickness measuring data. The ultrasonic sensing signal, the ultrasonic reflection signal, the minimum threshold of the ultrasonic reflection signal, the maximum threshold of the ultrasonic reflection signal and the flight time disclosed in Taiwan patent application (application number 110110056) filed by the applicant is incorporated herein.

Three different pipe names and specifications thereof according to the standard 1½"—ASTM-D1785 are listed in Table 5.

TABLE 5

| Pipe name | Mean outside diameter (mm) | Outside diameter tolerance (mm) | Pipe wall thickness (mm) | Pipe wall thickness tolerance (mm) |
|---|---|---|---|---|
| 1½"-ASTM-D1785-sch40 | 48.26 | ±0.15 | 3.68 | ±0.51 ~ 0.0 |
| 1½"-ASTM-D1785-sch80 | 48.26 | ±0.15 | 5.08 | ±0.61 ~ 0.0 |
| 1½"-ASTM-D1785-sch120 | 48.26 | ±0.15 | 5.72 | ±0.68 ~ 0.0 |

If the outside diameter measuring data and the pipe wall thickness measuring data generated by the processing unit 52 are 48.0 mm and 4.0 mm, the processing unit 52 selects the pipe name 1½"—ASTM-UPVC-sch 40 as the pipe name that matches the outside diameter measuring data and the pipe wall thickness measuring data. The main reasons that the processing unit 52 does not find out the pipe name matching the pipe wall thickness measuring data include: a new pipe, the ultrasonic probe 54 not contacted to the surface of the pipe 500, the pipe surface being worn or other elements being abnormal; for example, if the outside diameter measuring data is 48.0 mm and the pipe wall thickness measuring data is 8.0 mm, the processing unit 52 generates the check signal, and the communication interface 53 notices the user to check the pipe 500 and the device of determining pipe 5, or to add a new pipe name and specification thereof.

In case of abnormality in the pipe 500 transporting fluid, if the processing unit 52 determines the highest peak value of the first group of continuous waveform signal (i.e. the reflection signals R1, R2) being greater than the maximum threshold of the ultrasonic signal Rmax (as shown in FIG. 5B), it represents there is an abnormal air interface before the inner surface 500b of the pipe 500 opposite the ultrasonic probe 54 on the transmitting path along the radial direction of the pipe 500, the abnormal air interface (such as the ultrasonic coupling layer 55 not in close contact with the surface of the pipe 500, the pipe 500 being empty, a lot of air bubbles or solids in the pipe 500) reflects the sensing signal; the processing unit 52 generates a warning signal that represents the abnormality in transporting liquid of the pipe 500, and the communication interface 53 outputs the warning signal to notice the user to check the device of determining pipes 5 and the pipe 500. By utilizing and analyzing the ultrasonic signals, the device of determining pipe can measure the pipe wall thickness, further confirm the pipe name and the specification thereof, also has the functions of self-checking installation status and monitoring fluid in the pipe.

Figure 6A:
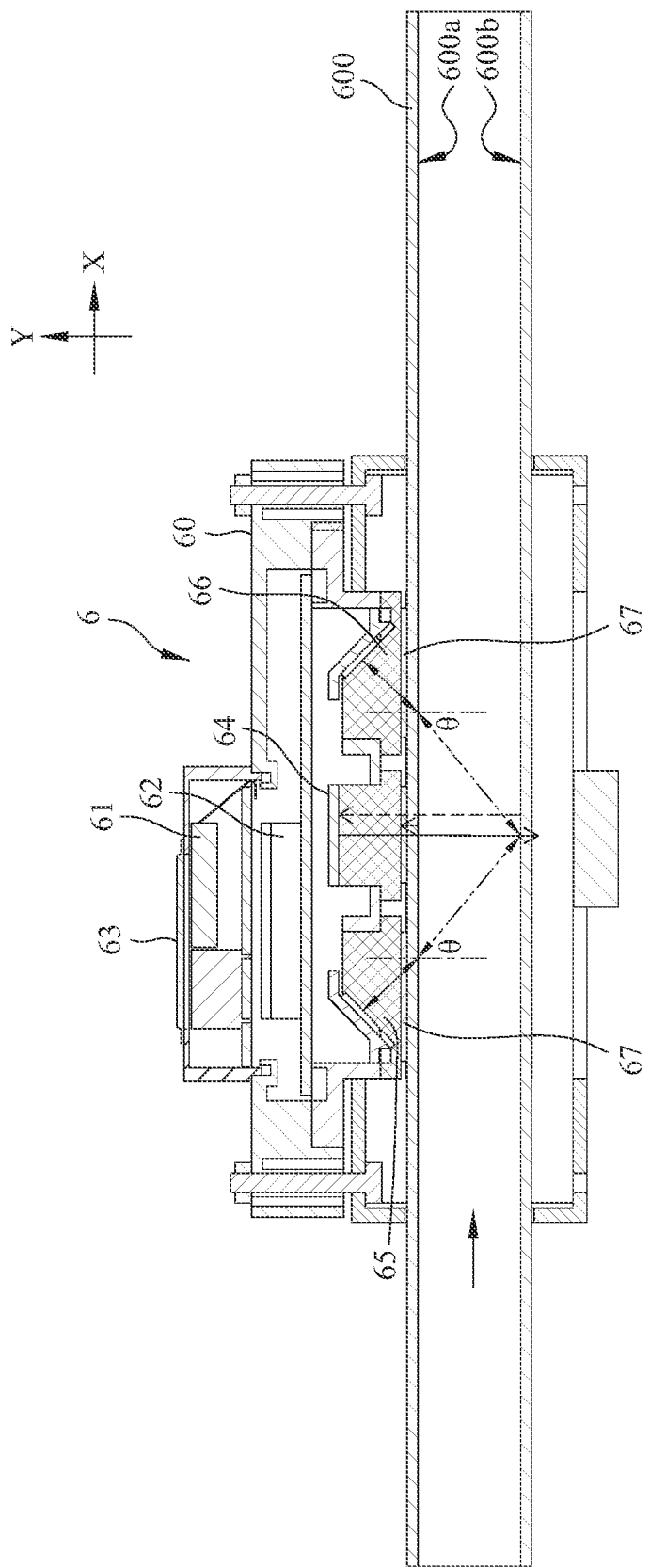
FIG. 6A is a cross-sectional view illustrating a time difference type flow meter according to an embodiment of the present application.
Figure 6B:
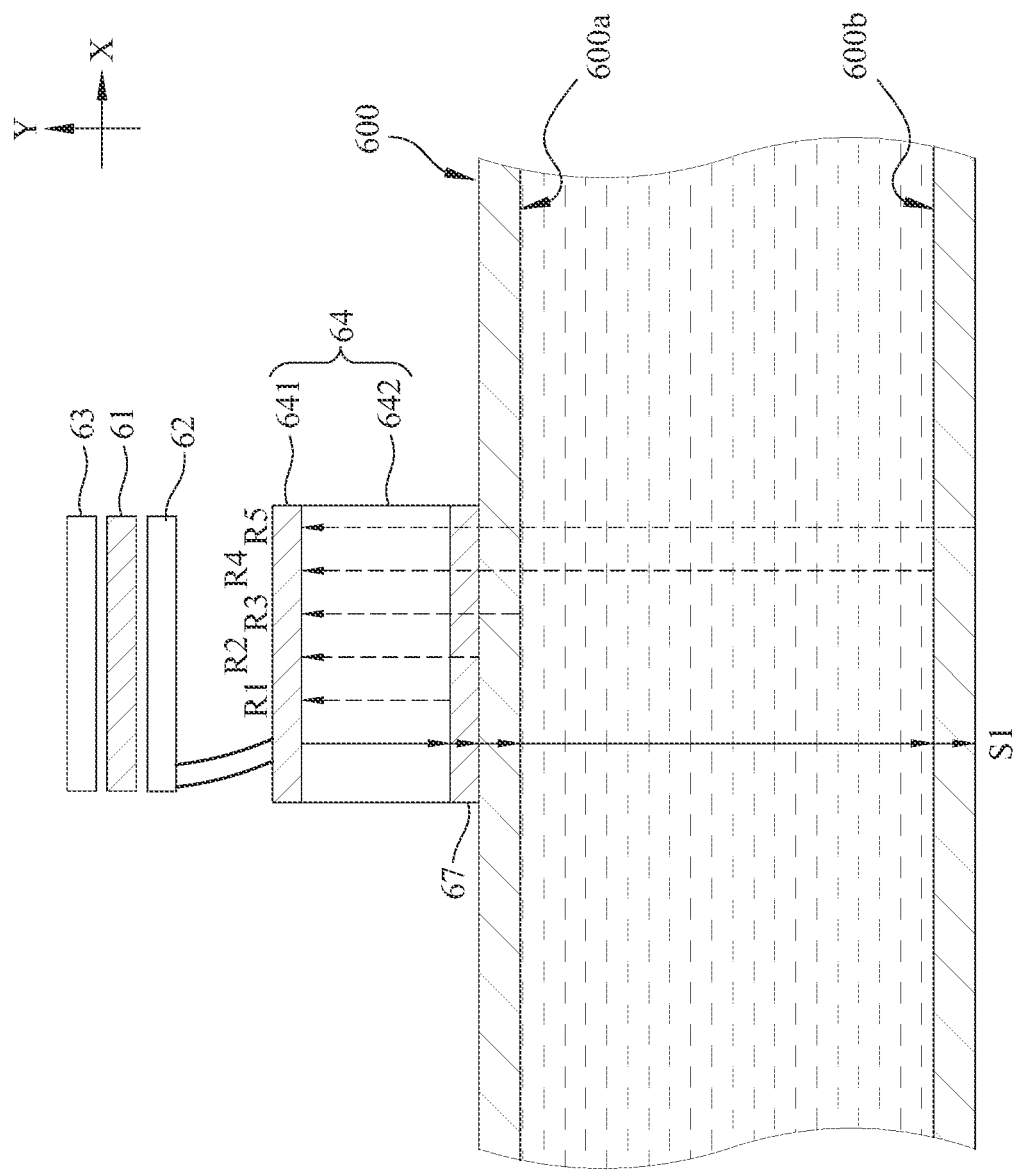
FIG. 6B is a cross-sectional view of a first ultrasonic probe shown in FIG. 6A.

The device of determining pipes can be combined with ultrasonic sensors for measuring flow rate to form a flow meter having functions of determining pipes and monitoring fluid in pipe. FIG. 6A is a cross-sectional view illustrating a time difference type flow meter according to an embodiment of the present application, FIG. 6B is a cross-sectional view of a first ultrasonic probe shown in FIG. 6A, and FIG. 6C is a transmission and reception signals diagram of the first ultrasonic probe shown in FIG. 6B. As shown in FIG. 6A, the present application provides a flow meter 6 having the functions of determining pipes and monitoring fluid in pipe, which includes a fixture 60 detachably fixed to an outer surface of a pipe 600, a memory unit 61, a processing unit 62, a communication interface 63, a first ultrasonic probe 64, a second ultrasonic probe 65, a third ultrasonic probe 66, a plurality of ultrasonic coupling layers 67 and a power unit (not shown). The processing unit 62 is connected to the memory unit 61, the communication interface 63, the first ultrasonic probe 64, the second ultrasonic probe 65 and the third ultrasonic probe 66 respectively. The first ultrasonic probe 64, the second ultrasonic probe 65 and the third ultrasonic probe 66 are arranged along a side of an axial direction (indicated by X-axis in FIG. 6) of the pipe 600. The plurality of ultrasonic coupling layers 67 is sandwiched between the first ultrasonic probe 64, the second ultrasonic probe 65, the third ultrasonic probe 66 and the outer surface of the pipe 600 respectively.

The memory unit 61 has stored the pipe names and the pipe specifications (including pipe wall thicknesses and pipe wall thickness tolerances), the reference pipe outside diameter values, and the orders of pipe names corresponding to the reference pipe outside diameter values, wherein the orders of pipe names are created by inputting the reference pipe outside diameter values into the outside diameter value probability function which is established according to mean outside diameters and outside diameter tolerances of the pipe names to obtain match probabilities and ordering the pipe names corresponding to the reference pipe outside diameter values according to the match probabilities from high to low. The processing unit 62 presets parameters of the sound velocity Vp of the pipe material, a sound velocity of reference fluid Vf0, a minimum threshold of ultrasonic reflection signal of the interface between the first inner surface 600a of the pipe and the fluid in the pipe (defined as a minimum threshold Rmin1 of ultrasonic reflection signal of a first time section), and a minimum threshold of ultrasonic reflection signal of the interface between the second inner surface 600b of the pipe and the fluid in the pipe (defined as a minimum threshold Rmin2 of ultrasonic reflection signal of a second time section), wherein the sound velocity Vp can be the sound velocity of specific material or the average sound velocity of common pipe materials, the sound velocity of reference fluid Vf0 can be the sound velocity of common fluids such as water, oil, solvent or the average sound velocity thereof, the minimum threshold Rmin 1 of ultrasonic reflection signal of the first time section can be obtained by measuring reflection signal strengths of various fluids in advance, and the minimum threshold Rmin2 of ultrasonic reflection signal of the second time section can be obtained by measuring reflection signal strengths of various fluids in advance.

In case of the pipe 600 transporting the fluid, after the processing unit 62 selected the pipe name that matches the outside diameter measuring data and the pipe wall thickness measuring data according to the steps of aforesaid embodiments, the processing unit 62 sets a flight time threshold Tth of the first sensing signal S1 and the reflection signal of the second inner surface 600b of the pipe going to and fro an inside diameter of the pipe 600 along the radial direction thereof according to the inside diameter of the pipe name that matches the outside diameter measuring data and the pipe wall thickness measuring data and the preset sound velocity Vf0 of reference fluid (the inside diameter of the pipe name is the reference pipe outside diameter value subtracted with two times of the pipe wall thickness, or the outside diameter measuring data subtracted with two times of the pipe wall thickness measuring data), wherein the flight time threshold Tth is between a flight time of the reflection signal of the first inner surface 600a and a flight time of the reflection signal of the second inner surface 600b (for example, Tth=N*the inside diameter/Vfo, 1<N<2), and then the processing unit 62 divides a time domain in which the first ultrasonic probe 64 receives the reflection signal into the first time section and the second time section according to the flight time threshold Tth.

Then, as shown in FIG. 6B, the processing unit 62 controls a piezoelectric material layer 641 of the first ultrasonic probe 64 transmit the first sensing signal S1 (indicated by solid arrow symbol in FIG. 6B) along the radial direction (indicated by Y-axis in FIG. 6B) of the pipe 600, and controls it receive the first reflection signal, wherein the first reflection signal includes the reflection signal R1 of the interface between an acoustic impedance matching layer 642 and the ultrasonic coupling layer 67, the reflection signal R2 of the interface between the ultrasonic coupling layer 67 and the outer surface of the pipe 600, the reflection signal R3 of the interface between the first inner surface 600a and the fluid in the pipe 600, the reflection signal R4 of the interface between the fluid in the pipe and the second inner surface 600b, and the reflection signal R5 (indicated by dotted arrow symbol in FIG. 6B) of the interface between the outer surface of the pipe 600 and ambient air.

As shown in FIGS. 6B and 6C, if the processing unit 62 determines that a high peak value of the continuous waveform signal within the first time section is greater than the minimum threshold Rmin 1 of the reflection signal of the first time section and a high peak value of the continuous waveform signal within the second time section is greater than the minimum threshold Rmin 2 of the reflection signal of the second time section, the processing unit 62 performs following steps: analyzing a first high peak value and a second high peak value of the two groups of continuous waveform signals in the first time section and a third high peak value and a fourth high peak value of the continuous waveform signal in the second time section; analyzing time points that the first high peak value, the second high peak value, the third high peak value and the fourth high peak value appear; defining a time point T0 that the first ultrasonic probe transmits the first sensing signal S1, the time points that the first to the fourth high peak values appear as a time point T1 of receiving the reflection signals R1, R2, a time point T2 of receiving the reflection signal R3, a time point T3 of receiving the reflection signal R4, a time point T4 of receiving the reflection signal R5 and a time point T5 of end of the reflection signal; generating a flight time (T3−T2) that the first sensing signal S1 and the first reflection signal go to and fro the inside diameter of the pipe 600 along the radial direction of the pipe according to the time point T2 of receiving the reflection signal R3 and the time point T3 of receiving the reflection signal R4; and generating a measured sound velocity Vf1 of the fluid according to the inside diameter of the pipe name that matches the outside diameter measuring data and the pipe wall thickness measuring data and the flight time (T3−T2) that the ultrasonic signal goes to and fro the inside diameter of the pipe (Vf1=2*the inside diameter/(T3−T2)). The processing unit 62 can store the flight time threshold Tth and the measured sound velocity Vf1 of the fluid in the memory unit 61, so as to increase the efficiency of calculating the flow rate.

It is noted that an interval between the reflection signals R4 and R5 is obvious than an interval between the reflection signals R1, R2 and R3 in the time sequence, so the processing unit 62 can calculate the pipe wall thickness measuring data by utilizing a flight time (T4−T3) of the first sensing signal and the first reflection signal going to and fro the second inner surface 600b of the pipe (the pipe wall thickness d=preset sound velocity of the pipe material vp*the flight time (T4−T3)/2), thereby generating the pipe name that matches the outside diameter measuring data and the pipe wall thickness measuring data.

Then, as shown in FIG. 6A, the processing unit 62 controls the second ultrasonic probe 65 transmit a second sensing signal towards an inclined direction of the pipe 600 (between the radial direction and the axial direction), the third ultrasonic probe 66 receive the second reflection signal of which the second inner surface 600b of the pipe reflects the second sensing signal, the third ultrasonic probe 66 transmit a third sensing signal towards an inclined direction of the pipe 600 (between the radial direction and the axial direction), and the second ultrasonic probe 65 receive the third reflection signal of which the second inner surface 600b of the pipe reflects the third sensing signal; the processing unit 62 presets an included angle Θ between the propagation direction of the second and third sensing signals in the fluid and the radial direction of the pipe 600, then performs following steps: calculating a co-current flight time of the second sensing signal and the second reflection signal, a counter-current flight time of the third sensing signal and the third reflection signal and a flight time difference between the co-current flight time and the counter-current flight time; generating a flow velocity of the fluid according to a flight path length of the second and third sensing signals, the time difference between the co-current flight time and the counter-current flight time, and the measured sound velocity Vf1 of the fluid (the flight path length=2*the inside diameter of the pipe/cos Θ, the fluid velocity=the measured sound velocity Vf1²*the time difference between the co-current flight time and the counter-current flight time/(2*sin Θ*the flight path length)); generating a radial cross-sectional area of the pipe 600 according to the inside diameter of the pipe 600; and generating a flow rate of the fluid in the pipe 600 according to the radial cross-sectional area of the pipe 600 and the flow velocity of the fluid (the flow rate=the flow velocity of the fluid*the radial cross-sectional area). The communication interface 63 outputs the flow velocity and rate of the fluid in the pipe (e.g. showing on the display).

With the technical means of the memory unit storing the pipe names and the order and specifications of the pipes and the processing unit automatically determining the pipe name and generating the inside diameter of the pipe and the measured sound velocity of the fluid, when installing the flow mater of the present application, the user does not need to input the parameters such as the pipe wall thickness, the inside diameter of the pipe, the type of fluid etc. to measure the flow rate, so that the technical threshold for setting and operating the flow meter is greatly reduced, and the efficiency and accuracy of measuring flow rate is improved. Moreover, the flow meter of the present application has the functions of self-determining and notifying the abnormal status of the flow meter and the pipe, thereby effectively avoiding measurement errors and window period of monitoring. It is noted that the arrangement and number of the ultrasonic probes for measuring flow rate are not limited to the V-type arrangement as shown in FIG. 6A, existing methods for measuring flow rate with the ultrasonic probes arranged in Z-type, N-type and W-type are applicable to the technical content of the flow meter of the present application.

Figure 7A:
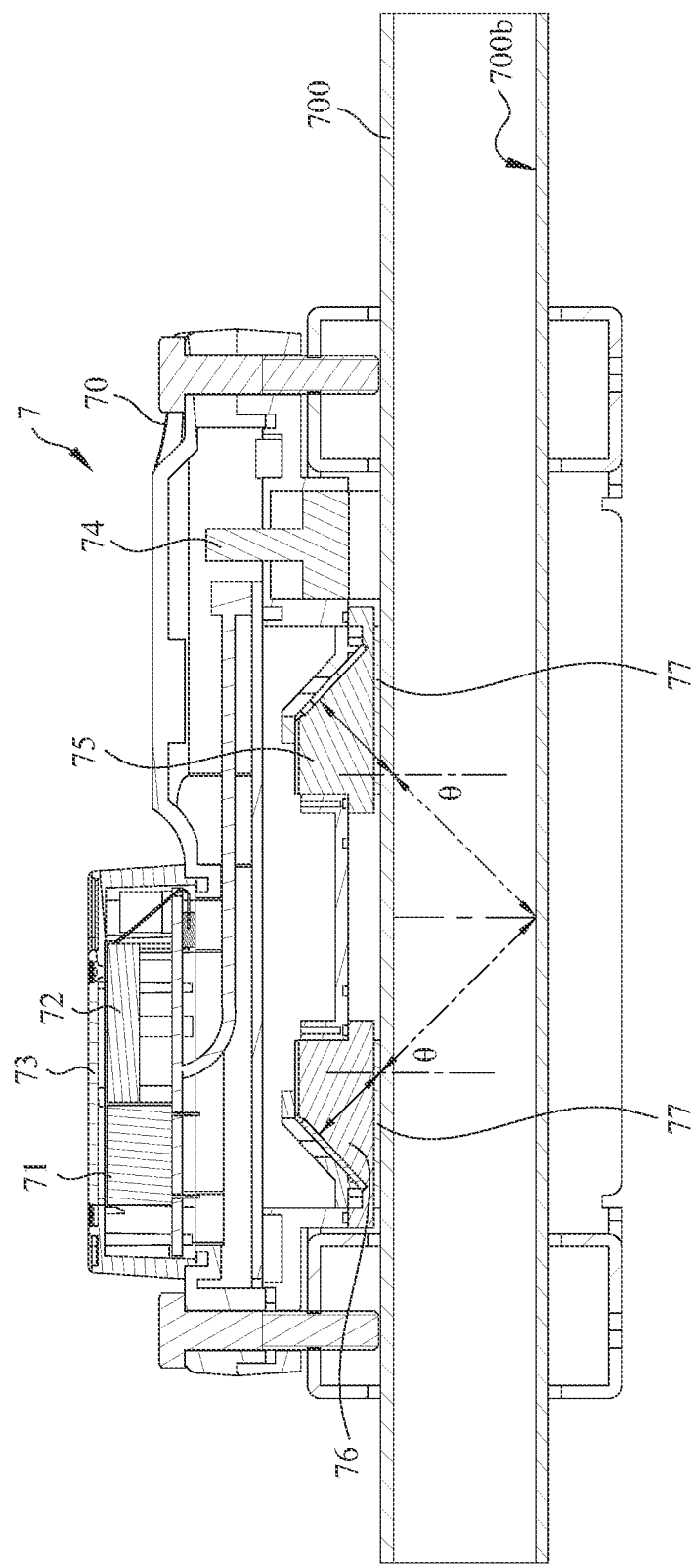
FIG. 7A is a cross-sectional view illustrating a time difference type flow meter according to another embodiment of the present application.
Figure 7B:
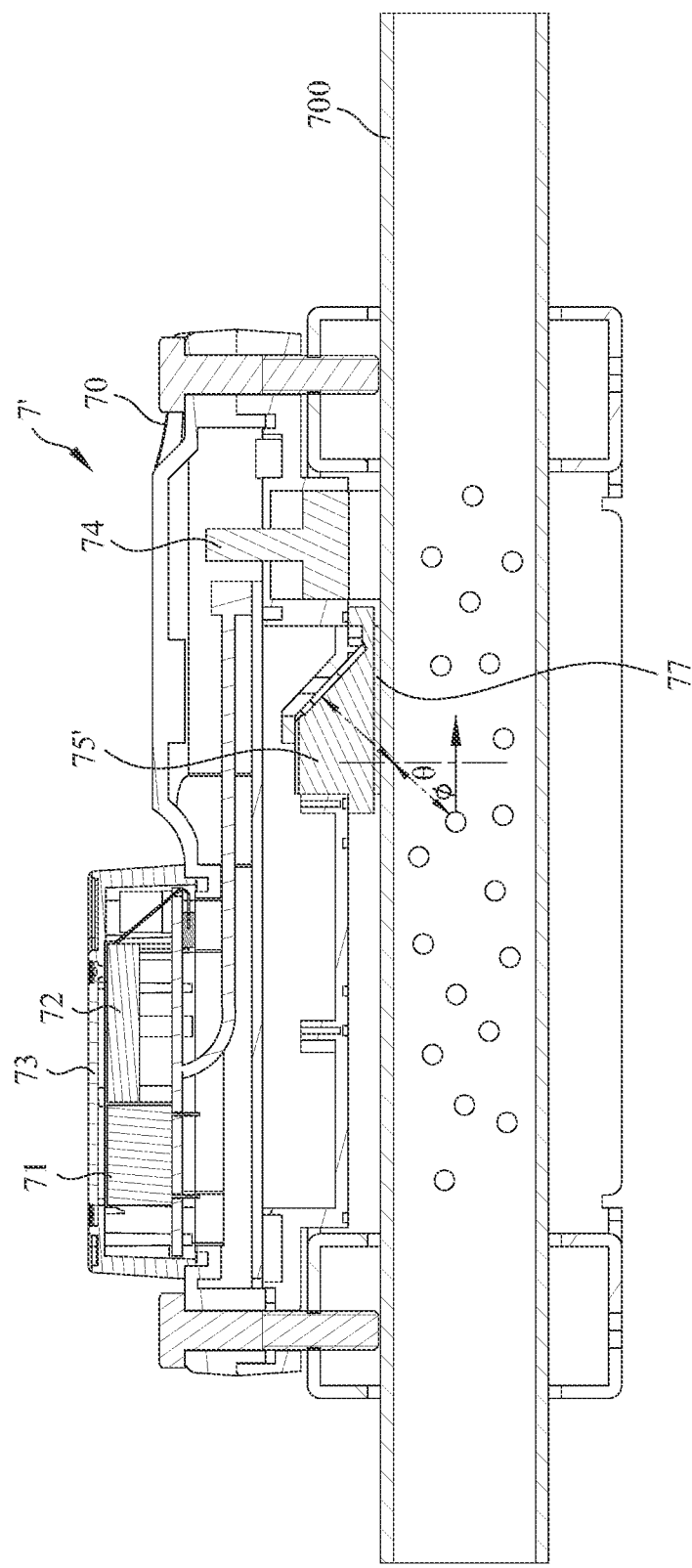
FIG. 7B is a cross-sectional view illustrating a Doppler flow meter according to an embodiment of the present application.
Figure 7C:
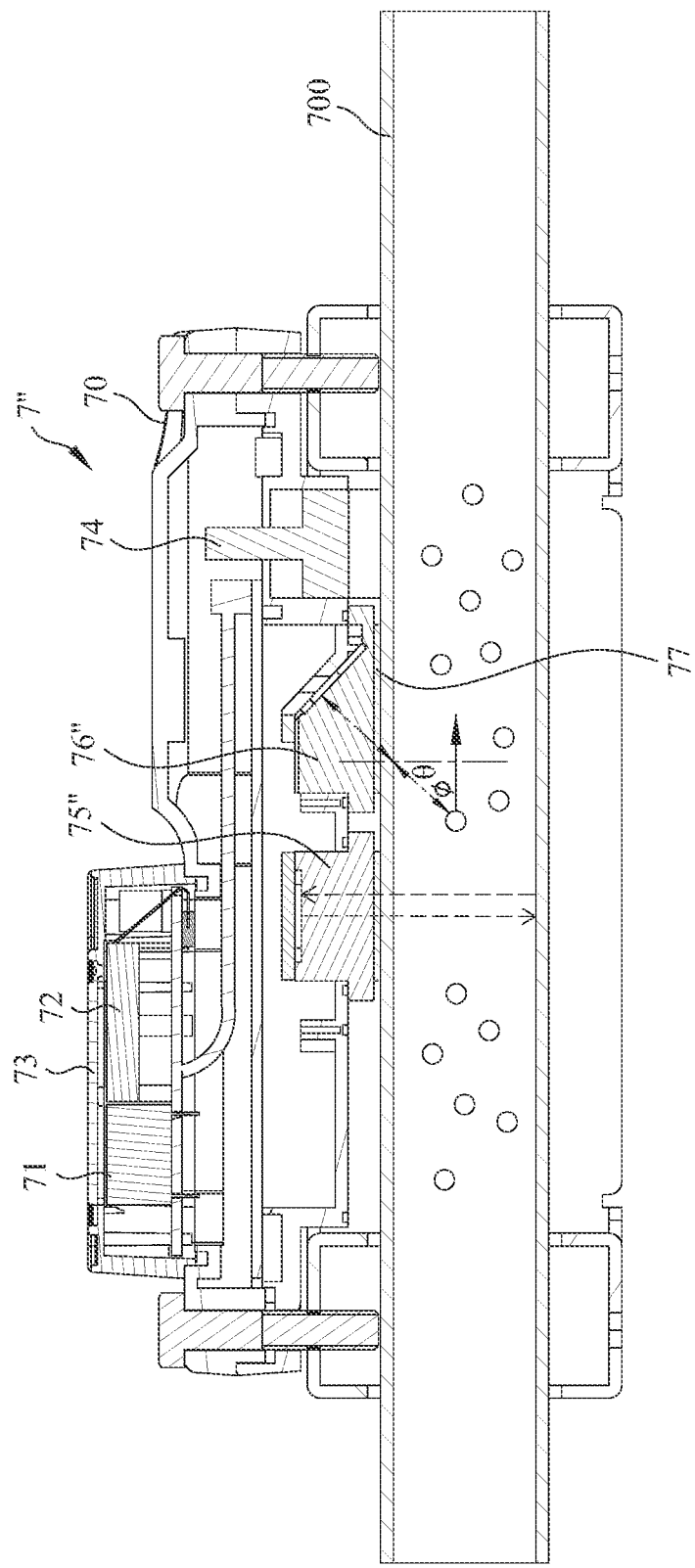
FIG. 7C is a cross-sectional view illustrating a Doppler flow meter according to another embodiment of the present application.

The flow meter of the present application can be incorporated with any of the aforesaid outside diameter measuring unit, FIGS. 7A, 7B, 7C illustrates other flow meters according to another embodiments of the present application. FIG. 7A is a cross-sectional view illustrating a time difference type flow meter according to another embodiment of the present application. As shown in FIG. 7A, a flow meter 7 includes a fixture 70, a memory unit 71, a processing unit 72, a communication interface 73, an outside diameter measuring unit 74, a first ultrasonic probe 75, a second ultrasonic probe 76, a plurality of ultrasonic coupling layers 77 and a power unit (not shown). The fixture 70 is detachably fixed on an outer surface of the pipe 700. The memory unit 71, the processing unit 72, the communication interface 73, the outside diameter measuring unit 74, the first ultrasonic probe 75, the second ultrasonic probe 76, the plurality of ultrasonic coupling layers 77 and the power unit are installed in the fixture 70. The processing unit 72 is respectively connected to the memory unit 71, the communication interface 73, the outside diameter measuring unit 74, the first ultrasonic probe 75 and the second ultrasonic probe 76. The plurality of the ultrasonic coupling layers 77 is sandwiched between the first ultrasonic probe 75, the second ultrasonic probes 76 and the outer surface of the pipe 700. The memory unit 71 has stored the plurality of reference pipe outside diameter values, the inside diameters of pipes corresponding to the plurality of reference pipe outside diameter values and the preset sound velocity of fluids.

After the flow meter 7 was installed on the outer surface of the pipe 700, the user turns on the flow meter 7, the outside diameter measuring unit 74 can automatically measure a curvature or the outside diameter of the pipe to generate the outside diameter measuring data; the processing unit 72 receives the outside diameter measuring data from the outside diameter measuring unit 74, then performs following steps: comparing the outside diameter measuring data with the plurality of reference pipe outside diameter values, selecting an inside diameter of the pipe of the reference pipe outside diameter same as the outside diameter measuring value; generating a radial cross-sectional area according to the inside diameter of the pipe corresponding to the outside diameter measuring data (the radial cross-sectional area=$\pi$*the inside diameter$^2$); controlling the first ultrasonic probe 75 transmit a first sensing signal along an inclined direction (between the radial direction and the axial direction) of the pipe 700; controlling the second ultrasonic probe 76 receive the first reflection signal which is the first sensing signal reflected by the an inner surface 700b of the pipe opposite the first ultrasonic probe 75 and the second ultrasonic probe 76; controlling the second ultrasonic probe 76 transmit a second sensing signal along the inclined direction of the pipe; controlling the first ultrasonic probe 75 receive a second reflection signal which is the second sensing signal reflected by the inner surface 700b. The processing unit 72 presets an included angle $\Theta$ between the propagation direction of the first and second sensing signals in the fluid and the radial direction of the pipe 700, then calculates a co-current flight time of the first sensing signal and the first reflection signal, a counter-current flight time of the second sensing signal and the second reflection signal and a flight time difference between the co-current flight time and the counter-current flight time, generates a flight path length according to the inside diameter of the pipe corresponding to the outside diameter measuring data and the included angle $\Theta$(the flight path length=2*the inside diameter of the pipe/cos $\Theta$), generates a flow velocity of the fluid according to the flight time difference, the flight path length and the radial cross-sectional area of the pipe (the flow velocity of the fluid=the preset sound velocity of the fluid*the flight time difference/(2*the flight path length*sin $\Theta$)), and generates a flow rate of the fluid in the pipe 700 according to the flow velocity of the fluid and the radial cross-sectional area of the pipe (the flow rate=the flow velocity of the fluid*the radial cross-sectional area of the pipe). The communication interface 73 outputs (e.g. showing on the display) the flow velocity and/or the flow rate of the fluid in the pipe 700.

In this embodiment, after the technician input all the reference pipe outside diameter values into the outside diameter value probability function(s) to generate the match probabilities of all the pipe names corresponding to the reference pipe outside diameter values by using the processing unit according to the aforesaid methods, it can be chosen that only the inside diameter of the pipe of the highest match probability or an average value of the inside diameters of the pipes of the match probabilities higher than the probability threshold is stored in the memory unit 71 (calculation formula: the inside diameter of the pipe=the reference pipe outside diameter value−2*the pipe wall thickness of the pipe specification), and the functions and parameters such as the pipe names, the outside diameter value probability function, orders of the pipe names, the match probabilities are not stored therein, so that the data storage capacity of the memory 71 can be saved, and the efficiency of the processing unit 72 in calculating the flow velocity and rate of the fluid in the pipe can be improved. The reference pipe outside diameter values and the inside diameters of the pipe corresponding thereto stored in the memory unit 71 are exemplarily shown in Table 6.

TABLE 6

| The reference pipe outside diameter values (mm) | The inside diameter of the pipe (mm) | Storage address |
|---|---|---|
| 48.1 | 40.7 | 0 × 0200 |
| 48.2 | 40.84 | 0 × 0500 |
| 48.3 | 40.94 | 0 × 0500 |

If the processing unit 72 cannot find out the inside diameter of the pipe that matches the outside diameter measuring data, the processing unit 72 generate a notification page of adding a new inside diameter of the pipe, the communication interface 73 outputs the notification page to notice the user to add the new inside diameter of the pipe; after the user input the new inside diameter of the pipe through the communication interface or input unit, the processing unit rewrites the outside diameter measuring data into a new reference pipe outside diameter value, and controls the memory unit 71 store the new inside diameter of the pipe corresponding to the new reference pipe outside diameter value.

FIG. 7B is a cross-sectional view illustrating a Doppler flow meter according to an embodiment of the present application. As shown in FIG. 7B, a flow meter 7' includes the fixture 70, the memory unit 71, the processing unit 72, the communication interface 73, the outside diameter measuring unit 74, a ultrasonic probe 75', the ultrasonic coupling layer 77 and the power unit (not shown), wherein the fixture 70 is detachably fixed on an outer surface of the pipe 700; the processing unit 72, the communication interface 73, the outside diameter measuring unit 74, the ultrasonic probe 75' and the power unit are installed in the fixture 70; the processing unit 72 is respectively connected to the memory unit 71, the processing unit 72, the communication interface 73, the outside diameter measuring unit 74 and the ultrasonic probe 75'; the ultrasonic coupling layer 77 is sandwiched between the ultrasonic probe 75' and the outer surface of the pipe 700; and the memory unit 71 has stored the reference pipe outside diameter values, the inside diameters of the pipes corresponding to the reference pipe outside diameter values and the preset sound velocities of the fluids.

Solid particles or bubbles (impurities) in the fluid in the pipe will scatter the ultrasonic signal, so the time difference type ultrasonic flow meter is not suitable for measuring the flow velocity and rate of the fluid containing a certain proportion of impurities. The Doppler flow meter calculates a velocity of the impurities moving in the fluid by utilizing frequency or phase difference between the ultrasonic signal reflected by the impurities and the original sensing signal, thereby generating the flow velocity and rate of the fluid. In this embodiment, after the processing unit 72 received the outside diameter measuring data generated by the outside diameter measuring unit 74, the processing unit 72 performs following steps: comparing the outside diameter measuring data with the reference pipe outside diameter values, selecting the inside diameter of the pipe corresponding to the reference pipe outside diameter value same as the outside diameter measuring data, generating a radial cross-sectional area of the pipe according to the inside diameter of the pipe corresponding to the outside diameter measuring data, controlling the ultrasonic probe 75' transmit a sensing signal and receive a reflection signal, which is the sensing signal reflected by the impurities in the fluid, along an inclined direction (between the radial direction and the axial direction) of the pipe 700; the processing unit 72 presets an included angle $\Phi$ between the propagation direction of the sensing signal in the fluid and the radial direction of the pipe 700, analyzes a frequency ft of the sensing signal and a frequency fr of the reflection signal, generates a flow velocity of the fluid in the pipe according to the preset sound velocity of the fluid, a frequency difference (fr−ft) between the frequencies of the sensing signal and the reflection signal and the included angle $\Phi$(the flow velocity of the fluid=the preset sound velocity of the fluid*(fr−ft)/(2*ft*cos $\Phi$)), and generates a flow rate of the fluid according to the radial cross-sectional area of the pipe and the flow velocity of the fluid.

FIG. 7C is a cross-sectional view illustrating a Doppler flow meter according to another embodiment of the present application. As shown in FIG. 7C, a flow meter 7" includes the fixture 70, the memory unit 71, the processing unit 72, the communication interface 73, the outside diameter measuring unit 74, a first ultrasonic probe 75", a second ultrasonic probe 76", the ultrasonic coupling layer 77 and the power unit (not shown), wherein the fixture 70 is detachably fixed on the outer surface of the pipe 700; the processing unit 72, the communication interface 73, the outside diameter measuring unit 74, the first ultrasonic probe 75", the second ultrasonic probe 76" and the power unit are installed in the fixture 70; the processing unit 72 is respectively connected to the memory unit 71, the processing unit 72, the communication interface 73, the outside diameter measuring unit 74, the first ultrasonic probe 75" and the second ultrasonic probe 76"; the ultrasonic coupling layer 77 is sandwiched between the first ultrasonic probe 75", the second ultrasonic probe 76" and the outer surface of the pipe 700; and the memory unit 71 has stored the reference pipe outside diameter values, the inside diameters of the pipes corresponding to the reference pipe outside diameter values and the preset sound velocities of the fluids.

In this embodiment, after the processing unit 72 received the outside diameter measuring data generated by the outside diameter measuring unit 74, the processing unit 72 performs following steps: comparing the outside diameter measuring data with the reference pipe outside diameter values, selecting the inside diameter of the pipe corresponding to the reference pipe outside diameter value same as the outside diameter measuring data, generating the radial cross-sectional area of the pipe according to the inside diameter of the pipe corresponding to the outside diameter measuring data, controlling the first ultrasonic probe 75" transmit a sensing signal and receive a reflection signal along the radial direction of the pipe 700, generating a flight time of the first sensing signal and the first reflection going to and fro the inside diameter of the pipe along the radial direction according to a time point of transmitting the first sensing signal and a time point of receiving the first reflection signal, and generating a measured sound velocity of the fluid according to the inside diameter of the pipe corresponding to the outside diameter measuring data and the flight time of the ultrasonic signals going to and fro the inside diameter of the pipe (the steps of the processing unit 72 generating the measured sound velocity of the fluid are as the aforesaid embodiment and shown in FIGS. 6B and 6C), then, controlling the second ultrasonic probe 76" transmit a sensing signal and receive a reflection signal, which is the sensing signal reflected by the impurities in the fluid, along an inclined direction (between the radial direction and the axial direction) of the pipe 700; the processing unit 72 presets an included angle 1 between the propagation direction of the sensing signal in the fluid and the radial direction of the pipe 700, analyzes a frequency ft of the second sensing signal and a frequency fr of the second reflection signal, generates a flow velocity of the fluid in the pipe according to the measured sound velocity of the fluid, a frequency difference (fr−ft) between the frequencies of the second sensing signal and the second reflection signal and the included angle $\Phi$(the flow velocity of the fluid=the measured sound velocity of the fluid*(fr−ft)/(2*ft*cos $\Phi$)), and generates a flow rate of the fluid according to the radial cross-sectional area of the pipe and the flow velocity of the fluid. By the function of the outside diameter measuring unit that can automatically measure the outside diameter of the pipe, when installing the flow meter of the present application, the user can measure the flow rate without inputting parameters such as the outside diameter and inside diameter of the pipe. It further reduces the technical threshold for setting and operating various type flow meters, and increases the efficiency and accuracy of measuring the flow rate.

Figure 8:
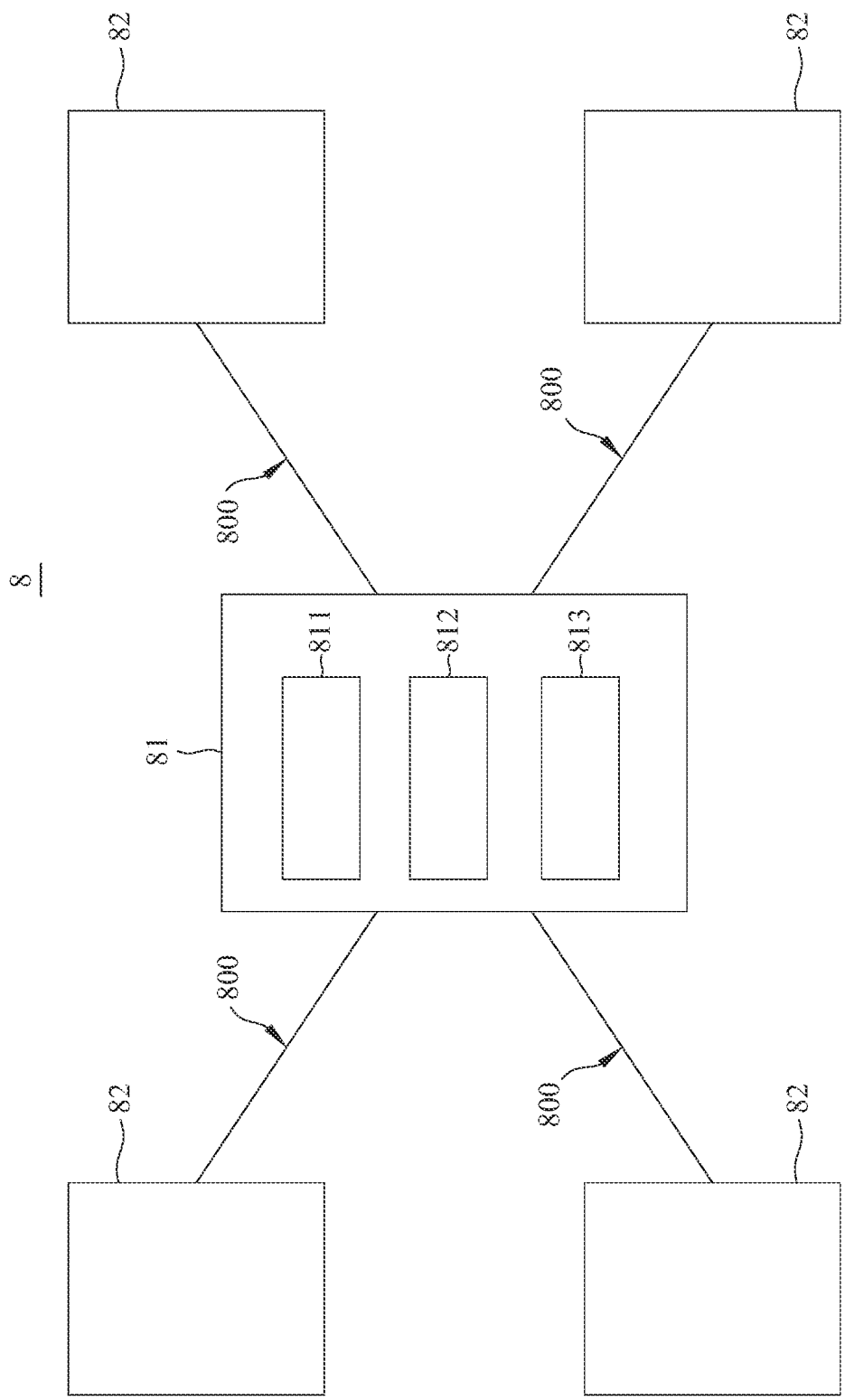
FIG. 8 is a block diagram illustrating a pipe monitoring system according to an embodiment of the present application.

The device of determining pipe of the present application can be configured in a remote computer monitoring plural pipes through network, to construct a pipe monitoring system based on Internet of Things (IoT). FIG. 8 is a block diagram illustrating a pipe monitoring system of the present application. As shown in FIG. 8, a pipe monitoring system 8 includes a device of determining pipes 81 and terminal devices 82, wherein the device of determining pipes 81 includes a memory unit 811, a processing unit 812 and a communication interface 813, the memory unit 811 has stored the plurality of pipe names and the outside diameter value probability function established by the mean outside diameters and the outside diameter tolerances of the pipe names, the processing unit 812 is connected to the memory unit 811 and the communication interface 813, and the communication interface is connected to the terminal devices 82 via a network 800. The processing unit 812 receives an outside diameter measuring data of a pipe from the terminal device 82 or a user, inputs the outside diameter measuring data of the pipe into the outside diameter values probability function to generate match probability of each of the pipe names, orders all or a part of the pipe names according to the match probabilities of the pipe names from high to low, and generates at least one of the pipe names that match the outside diameter measuring data according to the ordered pipe names. The communication interface 813 outputs the pipe name that matches the outside diameter measuring data.

In this embodiment, the device of determining pipes 81 is a server configured in a local network or internet, the memory unit 811 is a hard disk of the server, the processing unit 812 is a central processing unit of the server, the communication interface 813 includes a communication circuit capable of transmitting/receiving data, the terminal devices 82 can be, not limited to, the existing ultrasonic probes and flow meters installed on the pipes, user's computers. The pipe names, the specifications of the pipe names and the outside diameter value probability function corresponding to each of the pipe names stored in the memory unit 811 can refer to above Tables 1, 2 and the description, wherein the outside diameter value probability function is selected from one or more than one of the normal distribution function, the truncated normal distribution function, the uniform distribution function, the truncated skewed distribution function, the skewed distribution function, the Poisson distribution function, the triangular distribution function and the U-shaped distribution function, or a combination thereof. The distribution of outside diameter and thickness of the pipes made by respective pipe manufactures according to the pipe specifications of different country standards may be the normal distribution, the uniform distribution or the unilaterally skewed distribution; for example, the distribution of the outside diameter and thickness of CNS pipe is close to the normal distribution, the distribution of the outside diameter and thickness of ASTM pipe is close to the uniform distribution, the distribution of the outside diameter and thickness of DIN pipe is close to the unilaterally skewed distribution. Therefore, the outside diameter value probability function corresponding to different pipe names stored in the memory unit 811 may be the same or different, the operation process of the processing unit 812 generating the pipe name that matches the outside diameter measuring data is same as the operation of single reference pipe outside diameter value described in the first embodiment (the operation includes: receiving the outside diameter measuring data, generating the candidate pipes by comparing the outside diameter measuring data with the effective outside diameter range, generating the match probabilities of the candidate pipes by inputting the outside diameter measuring data and the mean values and standard deviations of the candidate pipes into the outside diameter value probability functions, and generating the pipe name that match the outside diameter measuring data according to the match probabilities from high to low).

The processing unit 812 can generate all the pipe names that match the outside diameter measuring data, for the user to utilize all the pipe names output by the communication interface 813. If the pipe names that match the outside diameter measuring data and the specifications thereof are provided to the terminal device 82 for direct use, the user can preset a probability threshold (e.g. 0.01, 0.05, 0.1) in the processing unit 812, the processing unit 812 may obtain the match probabilities of all the pipe names by inputting the outside diameter measuring data into the outside diameter value probability functions, then exclude the pipe name of the match probability less than the probability threshold, and order the pipe names of the match probabilities greater than the probability threshold; or the processing unit 812 may only select the pipe name of the match probability ordered at the first and the specification thereof, the communication interface 813 outputs the selected pipe name and the specification thereof for full-time measuring and real-time monitoring.

Specific regions or certain industries will use the pipes of specific standards and materials; in terms of regions, ASTM pipes are commonly used in United States, and CNS pipes are commonly used in Taiwan; in terms of industries, ASTM pipes and plastic pipes are commonly used in semiconductor industry, and seamless steel pipes are commonly used in food industry. For further improving the efficiency and accuracy of determining pipe specifications and monitoring pipes, the memory unit 811 can store pipe usage data and weighting factor conversion table, and the outside diameter value probability function of each the pipe includes the weighting factor, when the user inputs the pipe usage data (region of use, industry of use etc.) via the communication interface 813, the processing unit 812 searches the weighting factor corresponding to the input pipe usage data according to the pipe usage data and the weighting factor conversion table, and adjusts the weighting factor of the outside diameter value probability function of the pipe, then generates the match probabilities of the pipe names, the pipe names that match the outside diameter measuring data and the order and specifications thereof by inputting the outside diameter measuring data of the pipe into the adjusted outside diameter value probability function. The communication interface 813 transmits the pipe names that match the outside diameter measuring data and the order and specifications thereof to the terminal device 82 which requests that.

As described above, the device of determining pipe of the present application establishes the outside diameter value probability function according to the mean outside diameter and outside diameter tolerance of respective pipe names, and calculates the match probabilities of the reference pipe outside diameter value in the outside diameter value probability function, the memory unit stores the pipe names and the order of the pipe names corresponding to the reference pipe outside diameter value, the processing unit compares the outside diameter measuring data with the reference pipe outside diameter value to generate the pipe names that match the outside diameter measuring data, and the communication interface outputs the pipe name that match the outside diameter measuring data, thereby effectively resolving the problems of finding and testing pipe specifications. The device of determining pipes of the present application can be further combined with the elements which can automatically measure the pipe outside diameter, the pipe wall thickness, the pipe material or the flow rate in the pipe (such as the outside diameter measuring unit, the ultrasonic probe, the resistance measuring element and the hardness measuring element), the user does not need to measure and input the parameters such as the outside diameter and the pipe wall thickness, the processing unit can generate the more accurate pipe names, the specifications thereof and the flow rate, and determines abnormal conditions of the self-device and the pipe, so that the technical threshold of setting and operating the clamp-on type devices is reduced and the efficiency and accuracy of measuring the flow rate is improved. The pipe monitoring system based on IoT can be configured by combining the device of determining pipes of the present application and the terminal devices, and the pipe monitoring system can effectively obviate the measurement error, input error and monitoring window period, so as to achieve the goals of full-time measurement and real-time monitoring.

The above embodiments are merely illustratively illustrative of the principles of the present invention and its effects, and are not intended to limit the present invention. The above embodiments may be modified, combined and altered by anyone skilled in the art, without departing from the spirit and scope of the invention. Therefore, all equivalent modifications, combinations or alterations made by anyone skilled in the art without departing from the spirit and technical principles disclosed by the present invention shall remain within the following claim of the present invention.

What is claimed is:

1. A device of determining pipes, comprising:
    a memory unit, configured to store a plurality of pipe names, a plurality of reference pipe outside diameter values and orders of the plurality of pipe names corresponding to the plurality of reference pipe outside diameter values, wherein the orders of the plurality of pipe names are obtained by inputting the plurality of reference pipe outside diameter values into outside diameter value probability function which is established according to mean outside diameters and outside diameter tolerances of the plurality of pipe names to obtain match probabilities, and sorting the plurality of pipe names corresponding to the plurality of reference pipe outside diameter values according to the match probabilities from high to low;
    a processing unit, connected to the memory unit, configured to receive an outside diameter measuring data of a pipe, compare the outside diameter measuring data with the plurality of the reference pipe outside diameter values, select the order of the plurality of pipe names corresponding to the reference pipe outside diameter value same as the outside diameter measuring data, and generate at least one of the pipe names that match the outside diameter measuring data according to the order of the plurality of pipe names corresponding to the reference pipe outside diameter value same as the outside diameter measuring data;
    a communication interface, connected to the processing unit, configured to output the pipe name that matches the outside diameter measuring data; and
    an outside diameter measuring unit, connected to the processing unit, and having a sensor and a clamp; when the clamp holds an outer surface of the pipe, the sensor can measure a curvature or the outside diameter of the pipe to generate the outside diameter measuring data.

2. The device of determining pipes according to claim 1, wherein the outside diameter value probability function is selected from one or more than one of a normal distribution function, a truncated normal distribution function, a uniform distribution function, a truncated skewed distribution function, a skewed distribution function, a Poisson distribution function, a triangular distribution function and a U-shaped distribution function, or a combination thereof.

3. The device of determining pipes according to claim 1, wherein the processing unit generates the pipe name that matches the outside diameter measuring data by extracting the pipe name ordered at the first one in the order of the plurality of pipe names corresponding to the reference pipe outside diameter value same as the outside diameter measuring data.

4. The device of determining pipes according to claim 1, if all results that the processing unit compares the outside diameter measuring data with the plurality of the reference pipe outside diameter values are not the same, the processing unit generates a notification message of adding a new pipe name; and the communication interface outputs the notification message to prompt a user to add the new pipe name.

5. The device of determining pipes according to claim 1, further comprising a case and a fixture, wherein the memory unit, the processing unit and the communication interface are disposed in the case, and the fixture can detachably fix the case on an outer surface of the pipe.

6. The device of determining pipes according to claim 1, wherein the sensor is an angular displacement sensor or a linear displacement sensor.

7. The device of determining pipes according to claim 1, further comprising an ultrasonic probe, connected to the processing unit, wherein the memory unit has stored pipe wall thicknesses and thickness tolerances of the plurality of pipe names, when the ultrasonic probe is installed on an outer surface of the pipe, the ultrasonic probe can transmit a sensing signal along a radial direction of the pipe and receive a reflection signal from a wall of the pipe; the processing unit generates a pipe wall thickness measuring data according to the reflection signal, and selects the pipe name that the pipe wall thickness matches the pipe wall thickness measuring data from the pipe names that match the outside diameter measuring data; and the communication interface outputs the pipe name that matches the pipe wall thickness measuring data.

8. The device of determining pipes according to claim 1, further comprising a resistance measuring element, connected to the processing unit, and having two electrodes, wherein the memory unit has stored material resistance values of the plurality of pipe names; when the two electrodes are installed on an outer surface of the pipe, the resistance measuring element generates a resistance measuring data of the pipe; the processing unit selects the pipe name that the material resistance value matches the resistance measuring data from the pipe names that match the outside diameter measuring data; and the communication interface outputs the pipe name that matches the resistance measuring data.

9. The device of determining pipes according to claim 1, further comprising a hardness measuring element, connected to the processing unit, and having a retractable probe, wherein the memory unit has stored material hardness values of the plurality of pipe names; when the retractable probe is pressed against an outer surface of the pipe, the hardness measuring element generates a hardness measuring data of the pipe; the processing unit selects the pipe name that the material hardness value matches the hardness measuring data from the pipe names that match the outside diameter measuring data; and the communication interface outputs the pipe name that matched the hardness measuring data.

* * * * *